US010702839B2

(12) United States Patent
Sollazzo Lee et al.

(10) Patent No.: US 10,702,839 B2
(45) Date of Patent: Jul. 7, 2020

(54) PRECISION DISPENSING AND MIXING APPARATUS

(71) Applicant: Nik of Time, Inc., Newport Beach, CA (US)

(72) Inventors: Nicole Sollazzo Lee, Newport Beach, CA (US); William Patrick Conley, Long Beach, CA (US)

(73) Assignee: Nik of Time, Inc., Newport Beach, CA (US)

( * ) Notice: Subject to any disclaimer, the term of this patent is extended or adjusted under 35 U.S.C. 154(b) by 184 days.

(21) Appl. No.: 15/242,298

(22) Filed: Aug. 19, 2016

(65) Prior Publication Data

US 2017/0246604 A1    Aug. 31, 2017

Related U.S. Application Data

(60) Provisional application No. 62/301,244, filed on Feb. 29, 2016.

(51) Int. Cl.
*B01F 7/16*      (2006.01)
*B01F 15/02*     (2006.01)
(Continued)

(52) U.S. Cl.
CPC ....... *B01F 15/00194* (2013.01); *A47J 43/044* (2013.01); *B01F 7/0025* (2013.01);
(Continued)

(58) Field of Classification Search
CPC .......... B01F 15/00194; B01F 15/00415; B01F 7/0025; B01F 7/1695; B01F 15/00538;
(Continued)

(56) References Cited

U.S. PATENT DOCUMENTS 4,649,810 A    3/1987  Wong
4,696,329 A *  9/1987  Izzi ........................ B65B 1/32
                                                    141/1
(Continued)

FOREIGN PATENT DOCUMENTS

EP    2 682 029 A1    1/2014
FR    2 749 149 A1   12/1997
WO    2012080680 A1   6/2012

OTHER PUBLICATIONS

International Search Report and the Written Opinion of the International Searching Authority from the European Patent Office in International Application No. PCT/US2017/018815 dated May 9, 2017.
(Continued)

*Primary Examiner* — Charles Cooley
(74) *Attorney, Agent, or Firm* — The Marbury Law Group, PLLC

(57) ABSTRACT

A device, method, and system for precision measurement, dispensing, and mixing of ingredients. The device includes an ingredient container and a base unit. The ingredient container includes a dispensing mechanism selectively driven to dispense the ingredients from a lower aperture thereof. The base unit includes at least one drive motor, a mixing mechanism, and a dispensing aperture extending through the base unit and configured to allow the quantity of ingredients dispensed from the ingredient container to pass through the base unit to a removable mixing bowl. The base unit may selectively operate in a dispensing mode that drives the dispensing mechanism and in a mixing mode that drives the mixing mechanism to rotate a mixing component removably coupled to the base unit and configured to extend into
(Continued)

the removable mixing bowl for mixing the quantity of the ingredients dispensed from the ingredient container into the removable mixing bowl.

18 Claims, 12 Drawing Sheets

(51) Int. Cl.
   *A47J 43/044* (2006.01)
   *A47J 31/40* (2006.01)
   *B01F 15/00* (2006.01)
   *B01F 7/00* (2006.01)
(52) U.S. Cl.
   CPC ...... *B01F 7/1695* (2013.01); *B01F 15/00415* (2013.01); *B01F 15/00538* (2013.01); *B01F 15/0251* (2013.01); *A47J 31/404* (2013.01); *A47J 2043/04463* (2013.01); *B01F 2215/0014* (2013.01)
(58) Field of Classification Search
   CPC .......... B01F 15/0251; B01F 2215/0014; A47J 43/044; A47J 31/404; A47J 2043/04463
   See application file for complete search history.

(56) References Cited

U.S. PATENT DOCUMENTS

| | | | |
|---|---|---|---|
| 4,723,614 A * | 2/1988 | Lahti | G01G 7/06 177/120 |
| 4,756,348 A * | 7/1988 | Moller | B65D 90/626 141/128 |
| 4,779,522 A | 10/1988 | Wong | |
| 7,036,535 B1 | 5/2006 | Chandler | |
| 8,360,279 B1 | 1/2013 | Giles | |
| 8,523,014 B2 * | 9/2013 | Sollazzo | G01G 13/026 141/83 |
| 8,807,823 B2 * | 8/2014 | Williams | B01F 7/161 366/197 |
| 8,920,019 B2 * | 12/2014 | Kozlowski | A47J 43/042 366/199 |
| 9,010,993 B1 | 4/2015 | Overton | |
| 9,052,228 B2 * | 6/2015 | Sollazzo Lee | G01G 13/026 |
| 9,066,627 B2 * | 6/2015 | Baranowski | A23L 2/39 |
| 9,417,114 B2 * | 8/2016 | Geier | A47J 31/404 |
| 9,851,240 B2 * | 12/2017 | Sollazzo Lee | G01G 13/02 |
| 10,455,969 B2 * | 10/2019 | Dubief | A47J 31/404 |
| 2002/0089894 A1 | 7/2002 | Parlor, Sr. | |
| 2008/0277512 A1 * | 11/2008 | Vuijk | A47F 1/035 |
| 2013/0334247 A1 * | 12/2013 | Lee | G01G 13/026 222/77 |
| 2015/0023126 A1 | 1/2015 | Brown et al. | |
| 2016/0018250 A1 * | 1/2016 | Sollazzo Lee | G01G 13/02 222/1 |
| 2017/0246604 A1 * | 8/2017 | Sollazzo Lee | B01F 15/00194 |

OTHER PUBLICATIONS

International Preliminary Report on Patentability (Chapter 1 of the Patent Cooperation Treaty) from the International Bureau in International Application No. PCT/US2017/018815 dated Sep. 13, 2018. 8 pages.

* cited by examiner

PRECISION DISPENSING AND MIXING APPARATUS

RELATED APPLICATIONS

This application claims the benefit of priority to U.S. Provisional Patent Application 62/301,244 entitled "Precision Dispensing and Mixing Apparatus," filed Feb. 29, 2016, the entire contents of which are incorporated herein by reference.

BACKGROUND

Food preparation often involves using basic ingredients that are in granular form, e.g., flour of various types and origins, sugar of various types and origins, baking soda, baking powder, ground spices, powdered seasonings, or the like. Traditionally, granular ingredients are measured by volume, and many or even most recipes are written accordingly. However, it is known that measuring recipe ingredients by volume has drawbacks. For example, the ingredients may settle during storage, or may be loaded differently into the measuring vessels by different individuals, and accordingly the density will change. Therefore, equal volumes of an ingredient may have different weights, affecting the precision of the preparation.

SUMMARY

Various embodiments include devices, methods, and systems for precision measurement, dispensing, and/or mixing of ingredients. In particular, various embodiments include a precision measurement dispenser and mixing apparatus having an ingredient container for holding ingredients and a base unit configured to receive the ingredient container in a removably secured position thereon. The ingredient container includes a dispensing mechanism selectively driven to dispense a quantity of the ingredients from a lower aperture of the ingredient container. The base unit includes at least one drive motor, a mixing mechanism, and a dispensing aperture extending through the base unit and configured to allow the quantity of ingredients dispensed from the ingredient container to pass through the base unit to a removable mixing bowl. The base unit is configured to selectively operate in at least two modes including a dispensing mode and a mixing mode. In the dispensing mode, the at least one drive motor drives the dispensing mechanism of the ingredient container. In the mixing mode, the at least one drive motor drives the mixing mechanism to rotate a mixing component removably coupled to the base unit and configured to extend into the removable mixing bowl for mixing the quantity of the ingredients dispensed from the ingredient container into the removable mixing bowl.

In some embodiments, the base unit may include a container seat and a drive coupling protruding from a base of the container seat. The drive coupling may be rotationally driven by the at least one drive motor and configured to mate with the dispensing mechanism when the ingredient container is seated in the container seat. The base unit may include a clutch movable into at least one of a first position corresponding to the dispensing mode and a second position corresponding to the mixing mode. In the dispensing mode the clutch may couple the at least one drive motor to the dispensing mechanism. In the mixing mode the clutch may couple the at least drive motor to the mixing component. The at least drive motor may include a first motor and a second motor separate from the first motor. Activation of the first motor may correspond to the dispensing mode for driving the dispensing mechanism. Activation of the second motor may correspond to the mixing mode for driving the mixing component. The mixing component may include a pair of mixer blades disposed on opposite sides of the dispensing aperture. The base unit may include a lower housing and an upper housing extending laterally away from an upper portion of the lower housing. The dispensing aperture may be disposed in the upper housing above the mixing component. The at least one drive motor may be disposed in the lower housing. The base unit may include a container scale for measuring a weight of the ingredient container. The container scale may be disposed between the ingredient container and the mixing component. The base unit may include a dispensed ingredient scale for measuring a weight of the quantity of the ingredients dispensed from the ingredient container into the removable mixing bowl. The dispensed ingredient scale may be disposed below the mixing component.

Some embodiments include a blender attachment configured to be mounted on the base unit in place of the ingredient container. The blender attachment may include a blender container with an internal cutting unit driven by activation of the at least one drive motor in the mixing mode. Some embodiments may include a grinder. The grinder may be removably secured to a lower surface of an upper housing. The grinder may include a grinder aperture configured to be disposed below the dispensing aperture for receiving the quantity of the ingredients dispensed from the ingredient container. The grinder may be driven by activation of the at least drive motor in the mixing mode.

In some embodiments, the dispensing mechanism may include an internal auger. The auger may be configured to move ingredients in the ingredient container towards the auger such that the auger can dispense the ingredients through the lower aperture of the ingredient container. In some embodiments, the dispensing mechanism may include an internal auger and two paddles. Each paddle may be situated to either side of the auger and configured to feed ingredients in the ingredient container towards the auger such that the auger can dispense the ingredients through the lower aperture of the ingredient container. The base unit may be configured to simultaneously operate in the dispensing mode and the mixing mode.

Various embodiments include a method of dispensing and mixing a precise measurement of ingredients. The method may include activating a dispensing mode of a precision measurement dispenser and mixing apparatus, wherein activation of the dispensing mode causes at least one drive motor in a base unit to drive a dispensing mechanism in an ingredient container, wherein the base unit may be configured to receive the ingredient container in a removably secured position thereon, wherein driving the dispensing mechanism dispenses a quantity of the ingredients from a lower aperture of the ingredient container, wherein the base unit may include a dispensing aperture extending through the base unit and configured to allow the quantity of ingredients dispensed from the ingredient container to pass through the base unit to a removable mixing bowl; and activating a mixing mode of the precision measurement dispenser and mixing apparatus, wherein activation of the mixing mode causes the at least one drive motor to drive a mixing mechanism in the base unit that rotates a mixing component removably coupled to the base unit and configured to extend into the removable mixing bowl, wherein driving the mixing mechanism mixes the quantity of the ingredients dispensed from the ingredient container into the removable mixing bowl.

In some embodiments, the at least one drive motor may include a first drive motor used to drive the dispensing mechanism and a second drive motor used separately drive the mixing mechanism. In some embodiments, the method may include measuring an amount of time the dispensing mechanism may be driven by the at least one drive motor. The method may stop the dispensing mechanism from further dispensing ingredients from the ingredient container in response to the measured amount of time reaching a time limit based on a dispensing parameter. The dispensing parameter may be configured to dispense a measure of the ingredients from the ingredient container. The method may include receiving an input related to the ingredient container and determining the dispensing parameter for driving the dispensing mechanism based on the received input. The method may include receiving an identifier associated with a type of ingredient and determining an amount of time the dispensing mechanism should be driven for dispensing the type of ingredient indicated by the identifier.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include an apparatus that precisely dispenses, measures, and mixes ingredients, such as for food preparation according a recipe. The apparatus includes a base unit that supports a removably secured ingredient container and that selectively drives one or more mixing blades for automatically mixing dispensed ingredients in a mixing bowl. The ingredient container includes a dispensing mechanism driven by a motor in the base unit through a drive coupling. The base unit may drive the dispensing mechanism to dispense ingredients from the ingredient container through a dispensing channel in the base unit to the mixing bowl. The base unit may also selectively drive the one or more mixing blades for mixing the dispensed ingredients in the mixing bowl.

As used herein, the term "ingredients" refers to constituent elements that form a compound or part of a combination or mixture. In various embodiments, ingredients may be small pieces or granules (e.g., fine and/or course granular products), such as one or any combination of elements selected from flour, sugar, baking soda, baking powder, ground spices, powdered seasonings, dietary supplements, vitamins, minerals, herbs, other botanical elements, whole spices or seasonings, beans (e.g., coffee beans), peppercorns, rock-crystals, and/or chocolate chips. In various embodiments, ingredients may include or be limited to elements usable to make food, edible, or consumable products. In various embodiments, ingredients may be used to form one or more compounds or part of a combination or mixture usable for other than food, edible, or consumable products.

Figure 1A:
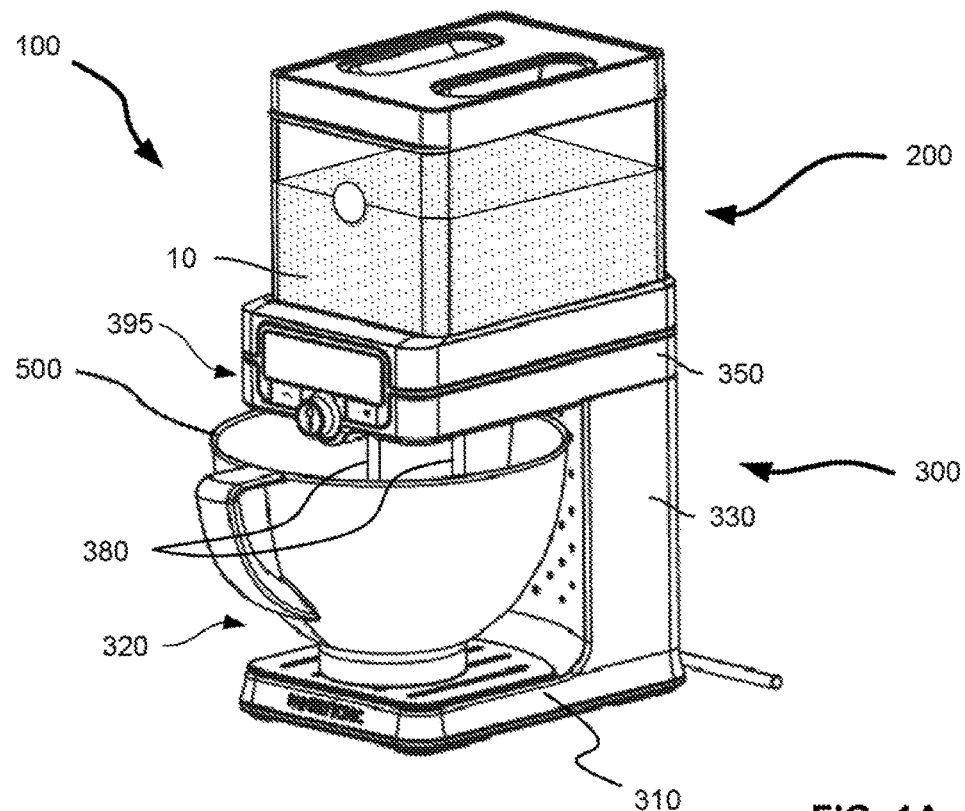
FIG. 1A illustrates a perspective view of a precision measurement dispenser and mixing apparatus according to various embodiments.
Figure 1B:
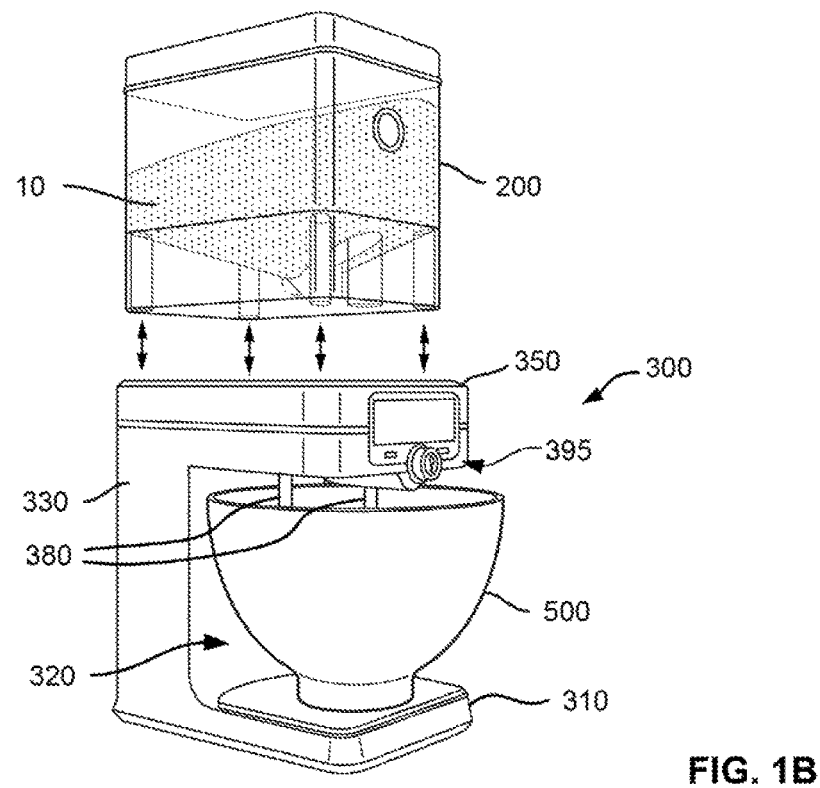
FIG. 1B illustrates a perspective view of a precision measurement dispenser and mixing apparatus with an ingredient container separated from a base unit, according to various embodiments.

FIGS. 1A-1B illustrate a precision measurement dispenser and mixing apparatus 100 in accordance with various embodiments. The precision measurement dispenser and mixing apparatus 100 includes an ingredient container 200 that holds one or more ingredients 10 and which may be removably secured on a base unit 300. The precision measurement dispenser and mixing apparatus 100 may control with precision and accuracy a quantity of the ingredients 10 that are dispensed from the ingredient container 200 into a mixing bowl 500 or other container. In addition, the precision measurement dispenser and mixing apparatus 100 may include a mixing component, such as one or more mixer blades 380, for mixing the quantity of the ingredients 10 dispensed into the mixing bowl 500.

In FIG. 1A, the ingredient container 200 is seated securely on the base unit 300. A user of the precision measurement dispenser and mixing apparatus 100 may remove (i.e., separate) the ingredient container 200 from the base unit 300. In FIG. 1B, the ingredient container 200 is shown separated from the base unit 300. The ingredient container 200 may be separated from the base unit 300 for cleaning, filling/refilling, and/or replacing with another ingredient container. The ingredient container 200 may include a dispensing mechanism (e.g., 250 in FIG. 2) for accurately dispensing the ingredients 10.

The base unit 300 may be configured to receive and hold securely the ingredient container 200 thereon. The base unit 300 may include a lower housing 330 that supports an upper housing 350. The upper housing 350 may protrude laterally away from an upper portion of the lower housing 330 (i.e., a cantilevered configuration) to form a retention area 320 below the laterally protruding portion of the upper housing 350 and adjacent the upper portion of the lower housing 330. The retention area 320 may be sized and configured to receive the mixing bowl 500 below at least a portion of the laterally protruding portion of the upper housing 350. Ingredients 10 dispensed from the ingredient container 200 are made to drop through the upper housing 350 into the mixing bowl 500, when the mixing bowl 500 is properly located in the retention area 320.

In various embodiments, the base unit 300 includes a control panel 395, which may provide a display and/or user interface for controlling operation of the precision measurement dispenser and mixing apparatus 100. In addition, the base unit 300 may include a housing platform 310 for supporting the mixing bowl 500 in the retention area 320. Once placed in the retention area 320, the mixing bowl 500 may be disposed between the upper housing 350 and the housing platform 310.

Figure 2:
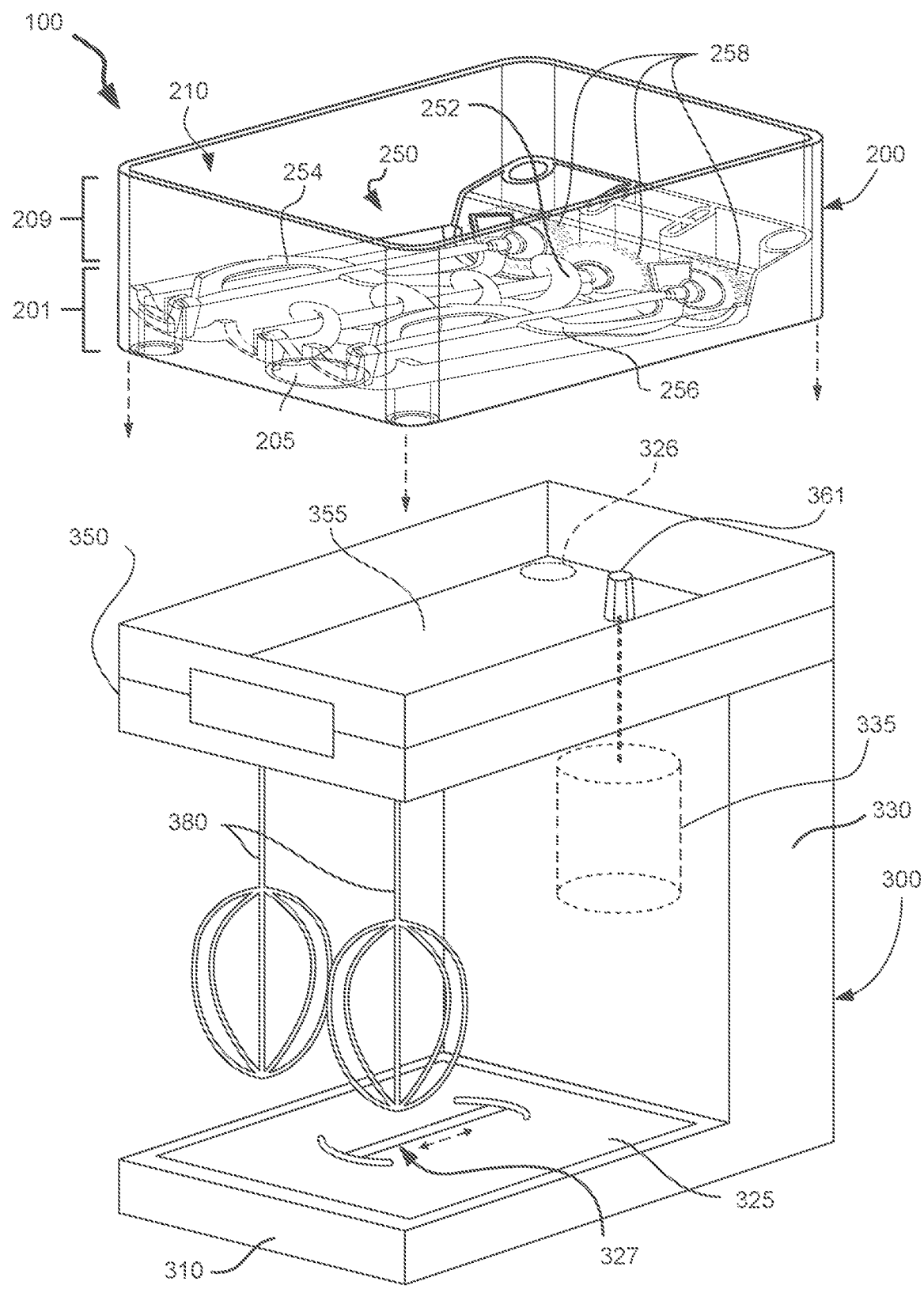
FIG. 2 illustrates a perspective view of the precision measurement dispenser and mixing apparatus with an empty ingredient container showing a dispensing mechanism therein, according to various embodiments.

FIG. 2 shows a perspective view of the precision measurement dispenser and mixing apparatus 100 without the mixing bowl (e.g., 500) and with the ingredient container 200 separated from the base unit 300. The base unit 300 may include an upper recess area 355 configured to securely receive the ingredient container 200 therein. In FIG. 2, the ingredient container 200 is illustrated without a lid and empty of ingredients to show a dispensing mechanism 250 included therein in accordance with various embodiments. The ingredient container 200 includes an internal cavity 210 that may be filled or partially filled with one or more ingredients 10. The dispensing mechanism 250 may be disposed in a lower container portion 201 of the internal cavity 210. Ingredients loaded into the internal cavity 210 may cover the dispensing mechanism and fill or partially fill the lower container portion 201 and an upper container portion 209 of the internal cavity 210.

The dispensing mechanism 250 may include an auger 252 and/or one or more paddles 254, 256, which may be driven by container gears 258. A drive coupling 361 that may be provided as an extension of a drive motor 335 in the base unit 300 may drive the dispensing mechanism 250 through engagement with the container gears 258. When the drive motor 335 is activated and the container gears 258 driven by the drive coupling 361, the auger 252 may rotate in conjunction with the paddles 254, 256 for pushing some of the ingredients 10 towards the dispensing aperture 205. The auger 252 may extend from a rear of the ingredient container 200 toward a front of the counter. The auger 252 includes blades or threads pitched such that rotation of the auger 252 in one direction will push any ingredients (e.g., 10) close to blades of the auger 252 toward the front of the ingredient container 200. In contrast, rotation of the paddles 254, 256 may be designed to push any ingredients close to blades of the paddles 254, 256 centrally toward a longitudinal axis of the auger 252. The auger 252, the left paddle 254, and the right paddle 256 may each extend parallel to one another from a rear of the ingredient container at a slight angle upward toward a front of the ingredient container. By flanking the auger 252, the paddles 254, 256 may ensure ingredients get pushed toward the longitudinal axis of the auger 252, while the auger pushes those ingredients along that longitudinal axis toward a dispensing aperture 205 in the ingredient container 200. When ingredients reach the dispensing aperture 205 a quantity of ingredients fall through the dispensing aperture 205 and are dispensed from the ingredient container 200. An amount of ingredients dispensed by the dispensing mechanism 250 may be measured by an amount or number of rotations of the auger 252 (i.e., auger metering). Such auger metering may be adjusted or correlated to particular ingredients, to accommodate variations if applicable. For example, each rotation of the auger 252 may be associated with dispensing a particular volume of ingredients. Such auger metering may be used in addition to or in place of measuring a weight of ingredients dispensed or a weight of ingredients not dispensed (i.e., remaining in the internal cavity 210).

The dispensing mechanism 250 may need cleaning or clearing from time to time. As such components thereof or the entire dispensing mechanism 250 may be configured to be removed from the ingredient container. For example, the dispensing mechanism 250 may be mounted on a removable carriage. Alternatively, a retention tab (e.g., 255 in FIG. 3) may hold particular components, such as the auger 252 and/or paddles 254, 256. Moving the retention tab may release the particular components the retention tab holds.

Various embodiments include the drive motor 335 located in the lower housing 330 of the base unit 300. Alternatively, the drive motor 335 may be located in the upper housing 350 or the housing platform 310. Also, more than one drive motor may be provided and distributed within one or more of the housing platform 310, the lower housing 330, and/or the upper housing 350. In addition, the drive motor 335 may selectively drive components other than the dispensing mechanism 250, such as the mixer blades 380 (discussed further below).

Some embodiments may include a dispensed ingredients scale 325 in the housing platform 310. The dispensed ingredients scale 325 may be configured to weigh the mixing bowl and any contents therein. The dispensed ingredients scale 325 may provide input to a processor (e.g., in controller 390 shown in FIG. 3) for calculating how much of the ingredients (e.g., 10) have been dispensed into the mixing bowl. A processor of the base unit 300 may use the output of the dispensing ingredients scale 325 to control operation of the drive motor 335 (or additional motors). For example, when a weight of dispensed ingredients reaches a designated amount, the motor 335 may be turned off or at least those elements dispensing ingredients may stop running. The scale 325 may be used to determine when to engage or disengage a clutch mechanism for operating in the dispensing mode. Alternatively or additionally, some embodiments may include a retained ingredient scale 326 in the upper housing 350 for weighing the ingredient container 200 and any ingredients therein.

Some embodiments may include securing apparatus 327 for securing the mixing bowl (e.g., 500) to the housing platform 310. The securing apparatus 327 may be mounted on an upper surface of the housing platform 310. Alternatively, other means of holding the mixing bowl in-place relative to the housing platform 310, such as sliding locks, may be employed.

Figure 3:
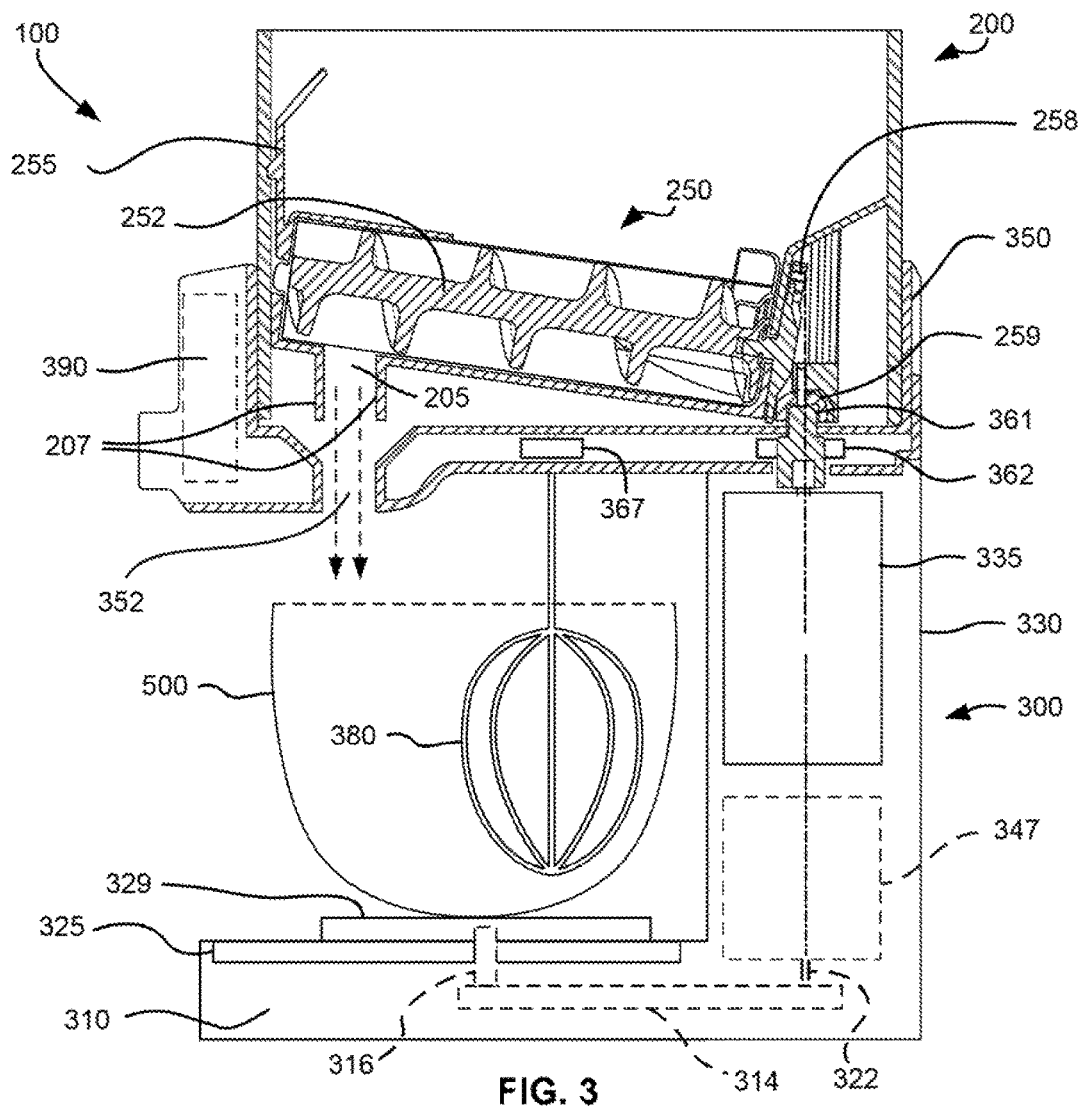
FIG. 3 illustrates a cross-sectional view of the precision measurement dispenser and mixing apparatus in accordance with various embodiments.

FIG. 3 is a cross-sectional side elevation view of the ingredient container 200 seated in the upper housing 350 of the base unit 300. In various embodiments, the base unit 300 may include a controller 390, as well as other electronics, to control (i.e., selectively activate) the various components therein, such as the drive motor 335, the control panel (e.g., 395), a power module (e.g., a transformer) and/or the dispensed ingredients scale 325. Although the controller 390 is illustrated as being disposed in the front of the upper housing 350, the controller 390 may alternatively or additionally be located almost anywhere within the base unit 300.

The controller 390 may include a processor, memory, and other circuitry and devices used to control the operation of the precision measurement dispenser and mixing apparatus 100. The processor and/or memory may be configured with processor-executable instructions to control operation of the controller 390. The processor and/or memory may record functions and/or operations as they are executed to save as a recipe for later use. The controller 390 may include a communication port or unit for receiving and/or outputting data (e.g., receiving an input related to the ingredient container in block 1810, FIG. 18). The communication port may provide a wired connection and/or be coupled to at least one transceiver and antenna for wireless communications. The communications (i.e., wired and/or wireless) may be used to input and/or output data. For example, the communication port may enable connectivity, such as through Wi-Fi, Bluetooth, or other wireless local area network (WLAN) connection, to one or more nearby computing devices (e.g., a smartphone, tablet, computer, etc.) and/or the internet. Local and/or remote connectivity may enable the download of software and/or firmware updates (e.g., fix bugs, load recipes, etc.), the input of immediate and/or stored operating instructions, or the output of data associated with the precision measurement dispenser and mixing apparatus 100. Data that is input and/or output may correspond to recipes and aspects relating to ingredients, such as the weight of ingredients in the ingredient container 200 currently seated on the base unit, an identification of particular ingredients associated with the currently mounted ingredient container 200, an identification of the currently mounted ingredient container 200 itself or other ingredient containers, a measure of a quantity of ingredients dispensed from the ingredient container 200, a measure of a quantity of ingredients held in the mixing bowl, etc. The communication port may provide access to websites and/or external programs. In this way, the controller 390 may be used to order replacement components for the device or ingredients as they run low, expire, or are otherwise needed. A user may register with an auto-replenishment service, allowing the controller 390 to order ingredients in response to determining they are needed, according to programmed requirements for doing so.

The processors may be any programmable microprocessor, microcomputer or multiple processor chip or chips that can be configured by software instructions (applications) to perform a variety of functions, including the functions of the various embodiments described herein. In some embodiments, multiple processors may be provided, such as one processor dedicated to communication functions and one processor dedicated to running other applications. Typically, software applications may be stored in the internal memory and/or before they are accessed and loaded into the processors. The processors may include internal memory sufficient to store the application software instructions.

In various embodiments, the controller 390 may include and/or use the communication port to connect to an output device, such as an audio output device (e.g., a speaker) and/or visual output device (e.g., display). Using the audio device, the controller 390 may provide instructions to a user, such as actions to take in following a recipe, informing a user to change the mixer blade for a different type, or to change the ingredient container. The controller 390 may also include a microphone for receiving user voice controls, such as turning the apparatus on, initiating preprogrammed functions, etc. The controller 390 may detect current configurations (i.e., accessories being used, ingredient containers or mixing blades that are mounted, etc) and ingredients. The controller 390 may use the determined configuration to instruct a user, if necessary, on actions to take to complete preparation according to a recipe, or record usage of the precision measurement dispenser and mixing apparatus 100.

In various embodiments, the controller 390 may selectively control the operation of the drive motor 335 and/or other components, such as a clutch assembly 362. In some embodiments, the base unit 300 may include a supplemental motor 347 and/or an additional motor (e.g., 345 in FIG. 9) controlled by the controller 390.

The controller 390 may control the base unit 300 for selectively operating in at least two modes, namely a dispensing mode and a mixing mode. In the dispensing mode, the drive motor 335 may drive the dispensing mechanism 250 of the ingredient container 200. In the mixing mode, the drive motor 335 may drive a mixing mechanism, including one or more mixer gears 367 that rotate one or more mixing components, such as the mixer blades 380. The mixer blades 380 may be removably coupled to the base unit and configured to extend into the removable mixing bowl 500 for mixing the quantity of the ingredients (e.g., 10) dispensed from the ingredient container 200 into the mixing bowl 500. In the dispensing mode, the drive motor 335 is activated to rotate the drive coupler 361. With the ingredient container 200 properly seated in the upper recess area 355 of upper housing 350 of the base unit 300, the drive coupler 361 may engage a receiving gear 259 that may be part of or at least coupled to the container gears 258. In this way, rotation of drive coupler 361 may drive the receiving gear 259, which in-turn drives the container gears 258, which in-turn drive the dispensing mechanism 250 for dispensing ingredients from the ingredient container 200.

The base unit 300 may be configured to operate in the dispensing mode alone, the mixing mode alone, and optionally both the dispensing and mixing modes simultaneously. The clutch assembly 362 may be included, which may lift and/or shift gear elements to selectively drive the drive coupler 361 and/or intermediate gears for driving the mixer gears 367. Alternatively, other gears or clutch device(s) may be included to separately drive the dispensing mechanism 250 from the mixer gears 367 or vise versa. In addition, other gears or clutch device(s) may be included to drive the dispensing mechanism 250 and/or mixer gears 367 at different speeds. Alternatively, an additional motor may be provided for separately driving the dispensing mechanism 250 and/or the mixing mechanism (i.e., the mixer blades 380).

Optionally, the drive motor 335, may be used to selectively drive an optional lower gear assembly 314 located in the housing platform 310. A lower gear assembly 315 may be used to operate (e.g., rotate) a base plate 329 on the housing platform 310. The lower gear assembly 315 may include gears, chains, pulleys, and/or rods connecting to a lower platform coupling 316 to drive various components. Additional gear components, such as a lower platform coupling 316 may be provided to rotate or otherwise move/adjust the base plate 329. With the drive motor 335 located in the lower housing 330, a coupling to gears in the housing platform 310 may be provided. Alternatively, the lower gear assembly 314 may be driven by the optional supplemental motor 347 by way of a supplemental drive shaft 322.

The base unit 300 may include a dispensing aperture 352 in the bottom of the upper recess area 355 extending through upper housing 350. The dispensing aperture 352 may be configured to align with the dispensing aperture 205 in the ingredient container 200 when the ingredient container 200 is seated on the upper housing 350. In this way, with the dispensing aperture 205 aligned with the dispensing aperture 352, dry ingredients moved by the auger 252 of the ingredient container 200 to the dispensing aperture 205 will drop down into the mixing bowl 500 through the dispensing aperture 352. In order to ensure ingredients dispensed from the dispensing aperture 205 are directed through the dispensing aperture 352, a dispensing aperture neck 207 may be provided. The dispensing aperture neck 207 may be formed as a tubular collar extending from the dispensing aperture 205 and configured to align with the dispensing aperture 352 when the ingredient container 200 is mounted on the base unit 300. Although the mixer blades 380 may be attached while dry ingredients are being dispensed, the mixer blades 380 may alternatively be removed before dispensing ingredients into the mixing bowl 500.

Figure 4:
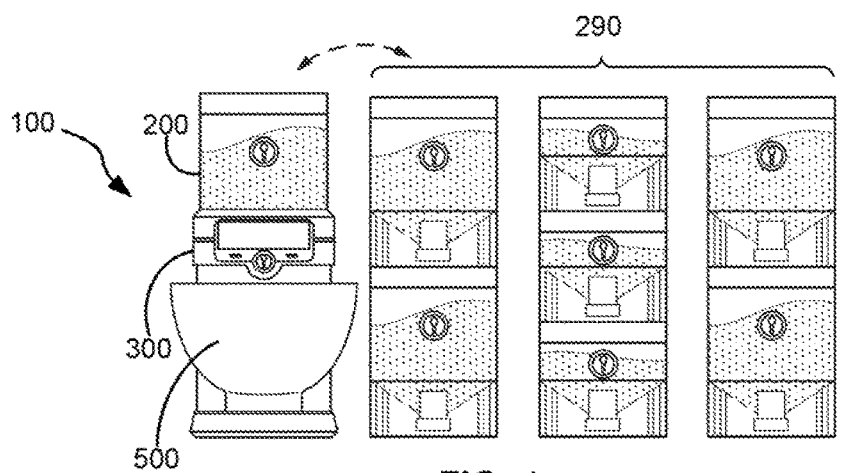
FIG. 4 illustrates a front view of the precision measurement dispenser and mixing apparatus next to stacks of interchangeable containers in accordance with various embodiments.

FIG. 4 is a front view of a precision dispensing and mixing apparatus 100 alongside three stacks of interchangeable containers 290 that may individually replace the ingredient container 200 already mounted on the base unit 300. Users may store different ingredients within different interchangeable containers 290. In this way, an appropriate one of the interchangeable containers 290 may be seated on the base unit 300 as need per a recipe.

The different interchangeable containers 290 may include an identifier, which may be manually input into the controller (e.g., 390) or automatically recognized by the controller, such as using near field communication (NFC), radio frequency identification (RFID), bar codes, and other wireless, optical, or electronic elements that enable identification of the interchangeable containers 290. In this way, the controller may be configured to recognize what types of ingredients are stored within a particular one of the interchangeable containers 290. This type of information may be used by the controller to help a user know which interchangeable container 290 should be loaded onto the base unit 300. Similarly, the controller and/or processor therein may be provided with processor-executable instructions for following a recipe. In this way, the controller may output information to a display, audio output device (e.g., a speaker), or communicate to a mobile computing device, which container and/or mixer blade needs to be loaded onto the base unit in accordance with a particular recipe. In addition, the recipe may inform the controller as to how much of each ingredient needs to be dispensed. After one ingredient is dispensed from a particular interchangeable container 290, the controller may instruct a user (i.e., through a display or audio message) to remove that interchangeable container 290 and load another particular interchangeable container 290 in accordance with the recipe.

In various embodiments, the controller may also provide inventory control for a user. For example, the controller may track how much of an ingredients remains within the ingredient container 200 mounted on the base unit 300. A scale may be used to measure ingredients remaining in the ingredient container 200 and/or a scale my measure dispensed ingredients in the mixing bowl 500. In this way, the controller may notify a user when a particular ingredient is low, finished and/or otherwise needs to be replenished or replaced. Alternatively or additionally, sensors may be included in the ingredient container 200 and interchangeable containers 290 for detecting moisture levels, spoilage, or other characteristics of the ingredients therein.

Figure 5:
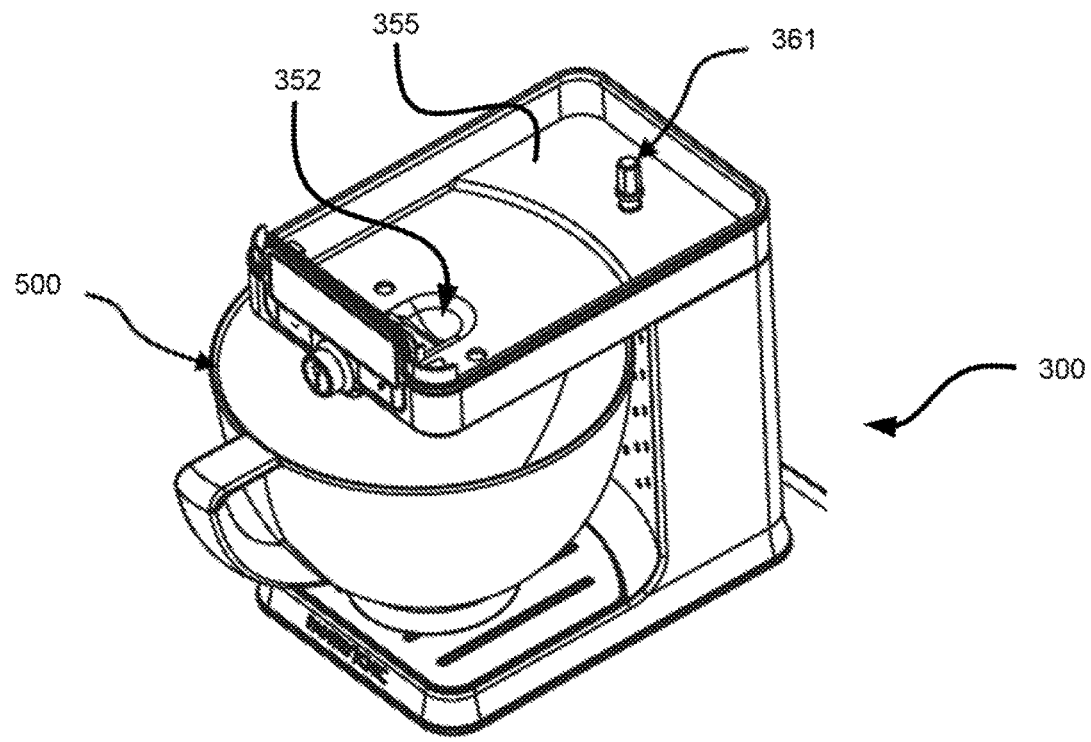
FIG. 5 illustrates a top perspective view of the precision measurement dispenser and mixing apparatus of FIGS. 1A and 1B, with the ingredient container and an upper housing trim removed, according to various embodiments.

FIG. 5 shows the base unit 300 without the ingredient container (e.g., 200). In addition, an upper housing trim of the base unit 300 is removed to more clearly show the upper recess area 355. In various embodiments, the drive coupler 361 may protrude from a base of the upper recess area 355 for mating with gears of the ingredient container when mounted thereon. The drive coupler 361 may protrude from a rear portion of the upper recess area 355. Alternatively, the drive coupler 361 need not protrude, but may be a recessed coupling element. As a further alternative or additionally, the drive coupler 361 need not be located in the rear portion of the upper recess area 355, but may be located anywhere within the upper recess area 355 to mate with at least one coupling gear in the ingredient container. Below a floor of the upper recess area 355, the base unit 300 may include gearing or drive mechanisms for driving the mixing mechanism, including the mixer blades 380.

In various embodiments, the dispensing aperture 352 may be located in a forward portion of the upper recess area 355. The dispensing aperture 352 may be located between the mixer blades 380. Alternatively, the dispensing aperture 352 may be more centrally located. The dispensing aperture 352 may have a covering or gate that may selectively opened and closed, which may coincide with activation of the dispensing mechanism in the ingredient container.

Figure 6:
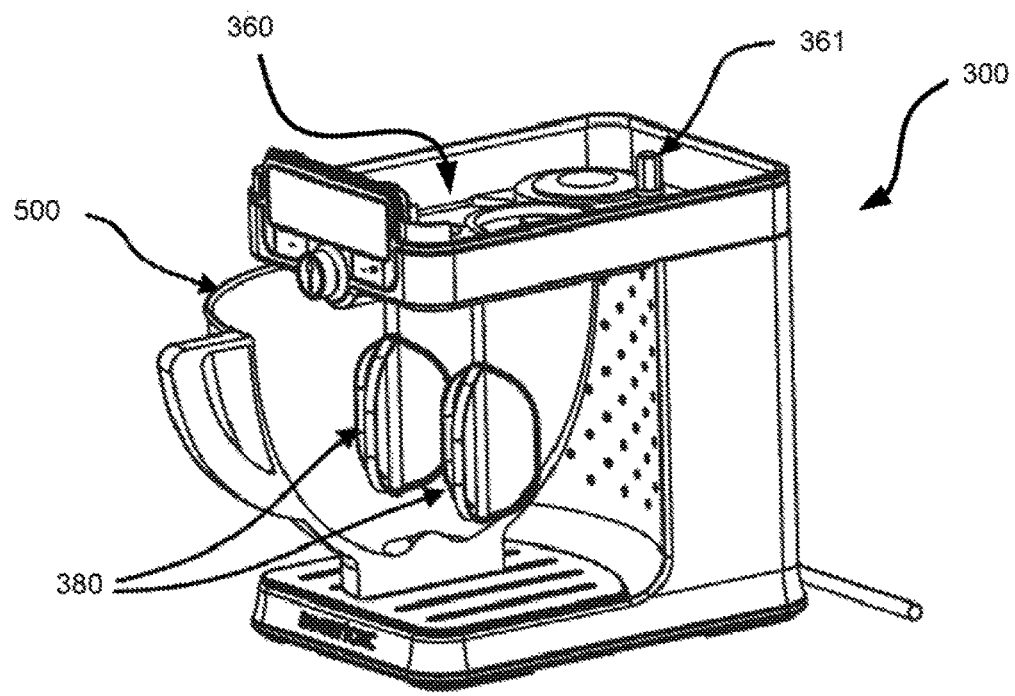
FIG. 6 illustrates a top perspective view of the precision measurement dispenser and mixing apparatus of FIG. 5 with a floor panel of an upper recess area removed to reveal an internal gear assembly, according to various embodiments.

FIG. 6 shows the base unit 300 illustrated in FIG. 5, but with a floor panel of the upper recess area 355 removed to reveal an internal gear assembly 360. The internal gear assembly may include drive gears situated below the upper recess area 355 to drive the mixer blades 380. The mixer blades 380 may extend downward from upper housing 350 into mixing bowl 500 (shown in section).

Figure 7:
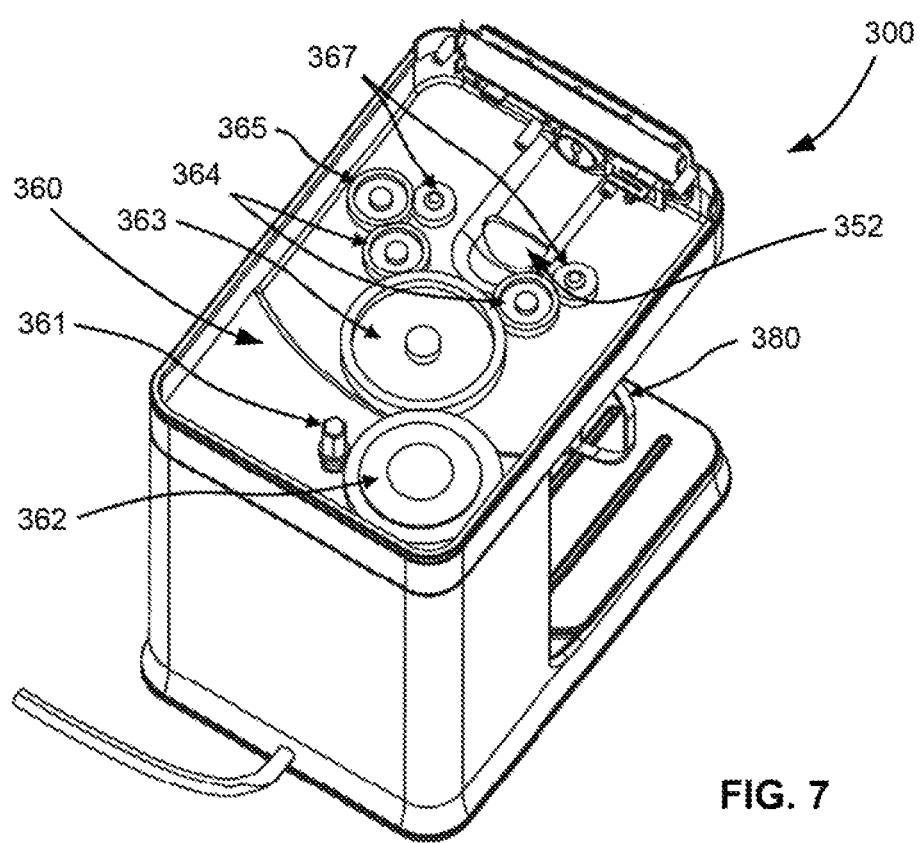
FIG. 7 illustrates a top perspective view of the precision measurement dispenser and mixing apparatus of FIG. 6, according to various embodiments.

FIG. 7 shows the base unit 300 illustrated in FIG. 6 from a top perspective view showing the internal gear assembly 360. In various embodiments, a two-blade mixer configuration may include two mixer gears 367 for driving the mixer blades 380. The two mixer gears 367 may be part of the internal gear assembly 360, which may also include a clutch assembly 362 and an idler gear train of intermediate gears 363, 364, 365 leading to the mixer gears. The clutch assembly 362 may be driven by the dispense coupler 361, which is driven by the drive motor 335. The clutch assembly 362 may be selectively disengaged from the dispense coupler 361 and/or the idler gear train. Alternately, the clutch assembly 362 may be an over-running type clutch that engages the idler gear train when the motor turns in one direction, but disengages when the motor turns in an opposite direction. The output of clutch assembly 362 when engaged drives the idler gear train that ultimately drives the mixer gears 367 to power the mixer blades 380. In other embodiments more gears or fewer gears may be included as necessary or desired. Although the internal gear assembly 360 includes exclusively gears, alternate mechanisms for transmitting rotational power from the dispense coupler 361 to the mixer blades 380 may be included. For example, one or more pulleys, shafts, chains, belts, and/or gears, or any combination thereof may be included. In addition, more than one clutch element may be provided to change gear ratios and/or allow selective use of various mechanisms.

The internal gear assembly 360 may be arranged to both drive the mixer blades 380, while also avoiding covering the dispensing aperture 352 in the upper housing 350. Alternatively, the dispensing aperture 352 may include an upward extension that extends and couples or aligns with a lower portion of the dispensing aperture 205 in the ingredient container (e.g., 200). Such an extension may ensure dispensed ingredients do not contaminate the internal gear assembly 360 as they pass from the ingredient container 200 to the mixing bowl 500. In an alternative embodiment, the dispensing aperture 205 of the ingredient container may have a dispensing aperture neck (e.g., 207 in FIG. 3) that may extend downward to mate or align with dispensing aperture 352 of the upper housing 350.

Figure 8:
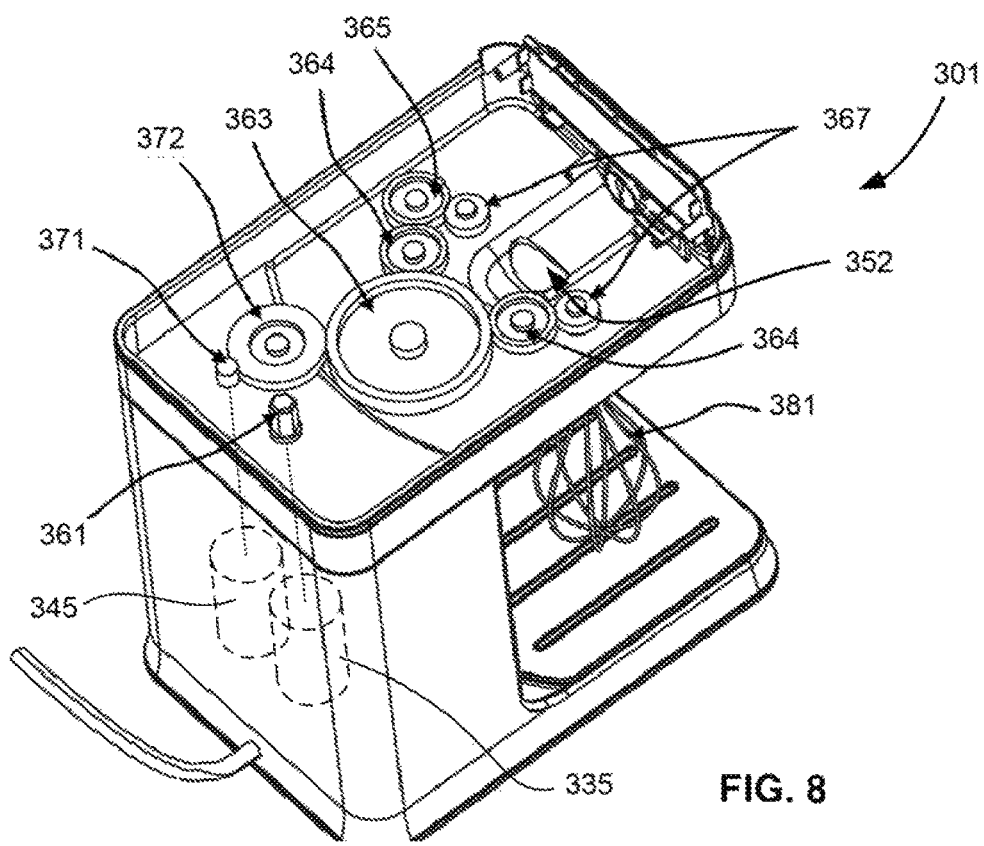
FIG. 8 illustrates a top perspective view of a precision measurement dispenser and mixing apparatus with an additional motor, according to various embodiments.
Figure 9:
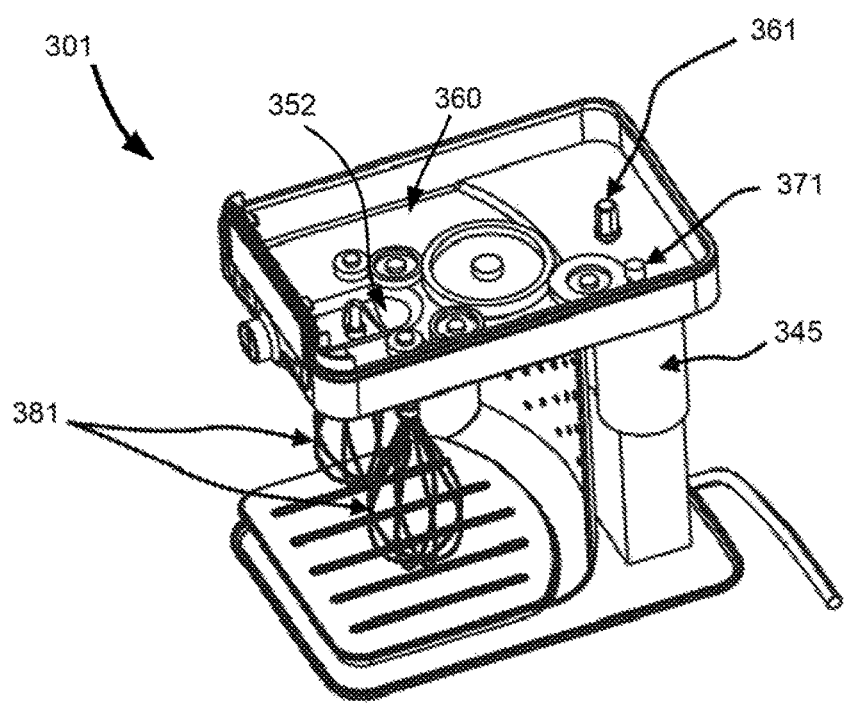
FIG. 9 illustrates a top perspective view of the precision measurement dispenser and mixing apparatus of FIG. 8, with an outer portion of the base unit removed revealing a motor and drive gears for two mixing components, according to various embodiments.

In various embodiments, a base unit 301 may include more than one drive motor, as illustrated in FIGS. 8 and 9. By including the drive motor 335 plus at least one additional motor 345, the base unit 301 may separately drive the gears controlling the dispensing mode and the mixing mode. For example, operating the drive motor 335 may control the dispensing mode, while operating the additional motor 345 may control the mixing mode. Alternatively, the additional motor 345 may control the dispensing mode and the drive motor 335 may control the mixing mode. In addition, separate motors 335, 345 may enable separate and/or selective variable speed and/or torque operation for each of the dispensing mode and the mixing modes. In addition, the separate motors 335, 345 may not need clutch assemblies for engaging and/or disengaging gears. Other than having a different number of drive motors, the base unit 300 and the base unit 301 may otherwise be the same. For example, the drive coupler 361 may still be used for the dispense function, driving the dispensing mechanism (e.g., 250) in the ingredient container 200 for dispensing a quantity of the ingredients through the dispensing aperture 352. The additional motor 345 may be disposed in the upper housing 350 for driving a mixing coupler 371 that is separate from the dispense coupler 361. The mixing coupler 371 may drive the internal gear assembly 360, including the idler gear train (e.g., intermediate gears 363, 364, 365) that ultimately drives the mixer gears 367 to power the mixer blades (e.g., 380) or other mixing components, such as the mixer whisks 381. Other mixing components may be substituted for the mixer whisks 381 or mixer blades, such as mixing paddles, blades, etc.

Figure 10:
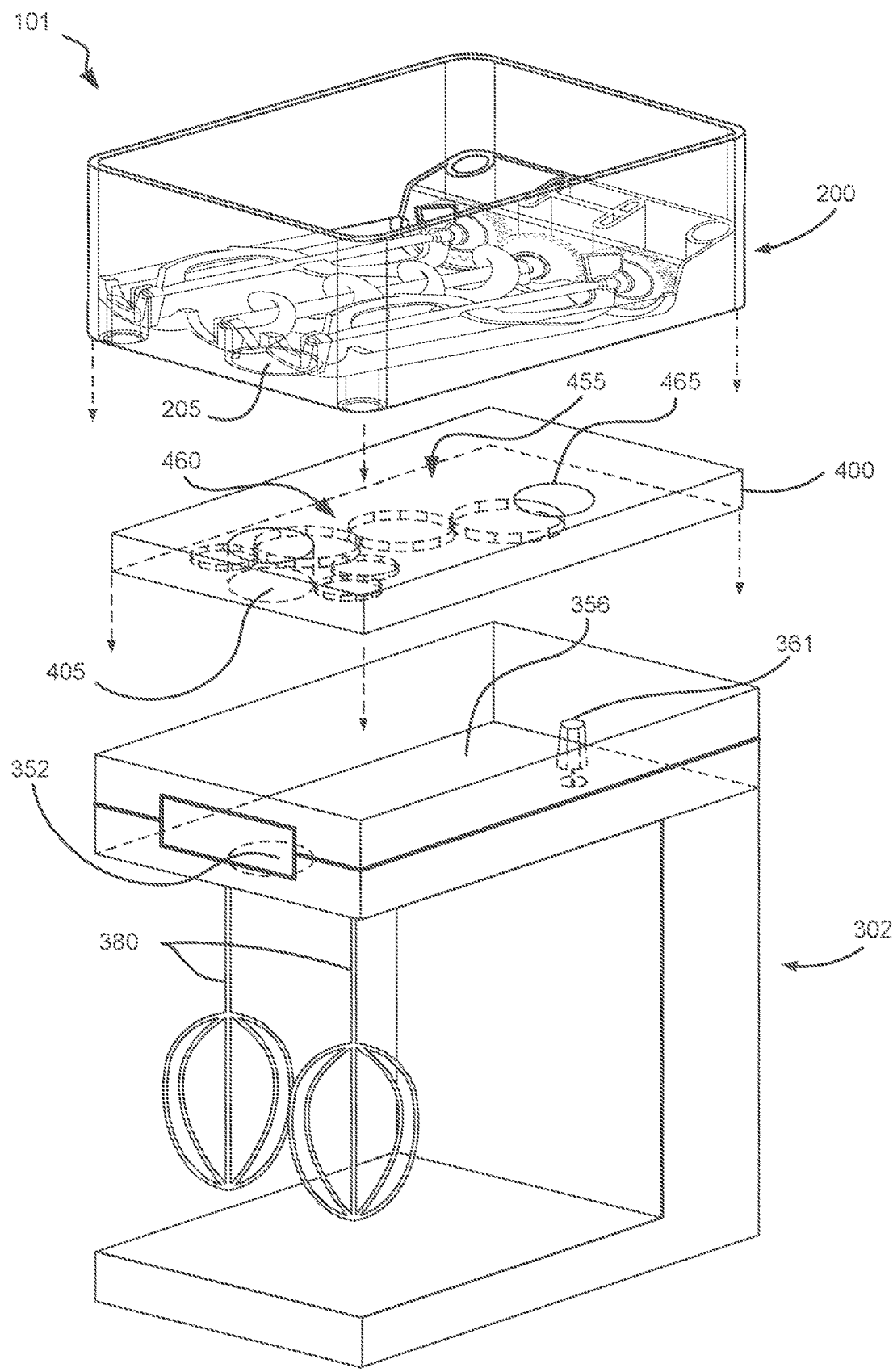
FIG. 10 illustrates a perspective view of the precision measurement dispenser and mixing apparatus with removable drive gear insert and canister details in accordance with various embodiments.

FIG. 10 is a perspective view of a precision dispensing and mixing apparatus 101 that includes a base unit 302 separated from the ingredient container 200 and a drive insert 400 configured to sit between the base unit 302 and the ingredient container 200.

Although the base unit 302 is configured to hold and drive the mixer blades 380, the base unit 302 does not include a fixed internal gear assembly (e.g., 360). Rather, a larger upper recess area 356 may be included in the base unit 302, which is configured to receive and hold the drive insert 400. The drive insert 400, which may be removable, and may include insert gears 460 that are provided in place of the internal gear assembly 360 from the base unit 300 (i.e., FIGS. 1A-7). The larger upper recess area 356 may be deep enough to accommodate both the drive insert 400 and still allow the ingredient container 200 to be mounted on top. Alternatively, the drive insert 400 may include an upper recess for receiving and holding the ingredient container 200 therein.

The insert gears 460 may be the same or analogous to the internal gear assembly 360 from the base unit 300, and may thus be configured to transfer the rotational drive of the drive coupler 361 to the mixer blades 380. The drive insert 400 may include an inner chamber 455, which holds an insert gears 460. Alternatively, the drive insert 400 may include other drive mechanisms such as chains, pulleys, shafts, etc.

In addition, the drive insert 400 may include a pass-through aperture 405 that allows ingredients (e.g., 10) that pass from the dispensing aperture 205 to pass through the drive insert 400 to the dispensing aperture 352 and beyond into the mixing bowl (e.g., 500). In addition, the drive insert 400 may have an opening 465 to accommodate the drive coupler 361, which may extend into the inner chamber of the drive insert 400 to couple with and drive the insert gears 460. A vertical thickness of the drive insert 400 may be configured to allow the dispense coupler 361 to pass entirely through the opening 465 for mating with the dispensing mechanism (e.g., 250) of the ingredient container 200. Alternatively, the opening 465 may be a coupling or gear that mates with the drive coupler 361 directly and may drive the insert gears 460, as well as being configured to mate with and drive the dispensing mechanisms of the ingredient container 200. In another embodiment, the insert gears 460 may include a clutch mechanism used to selectively control and drive the mixer gears and/or the dispensing mechanism.

Alternatively, an additional aperture may be included and the insert gears 460 rearranged to accommodate a separate additional motor (e.g., 345) for driving the insert gears 460. Such an alternative driver insert 400 may accommodate a multi-motor embodiment of the precision dispensing and mixing apparatus 101.

Figure 11:
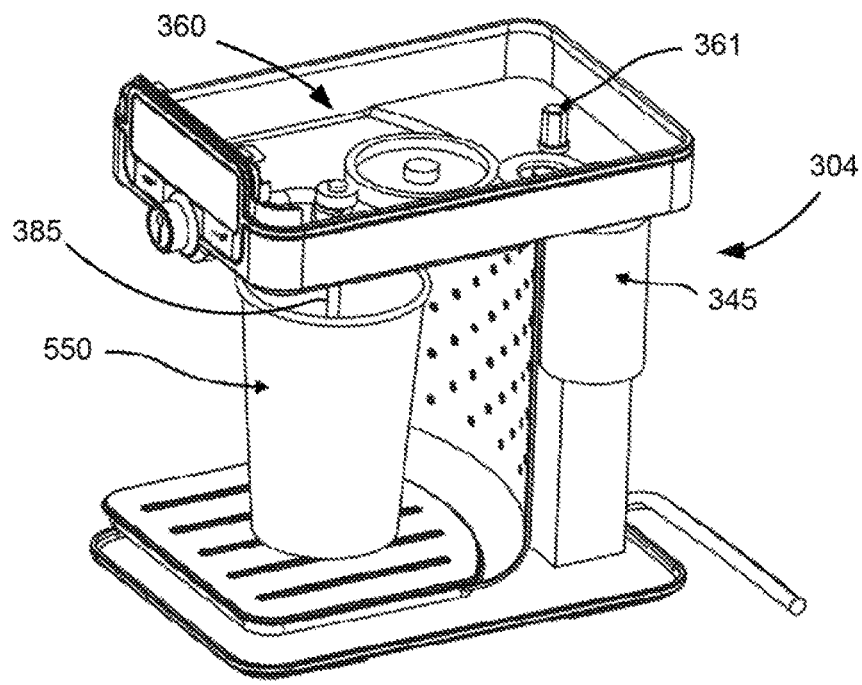
FIG. 11 illustrates a perspective view of the precision measurement dispenser and mixing apparatus with drive gears for a single accessory mixing component driven by an additional motor in accordance with various embodiments.
Figure 12:
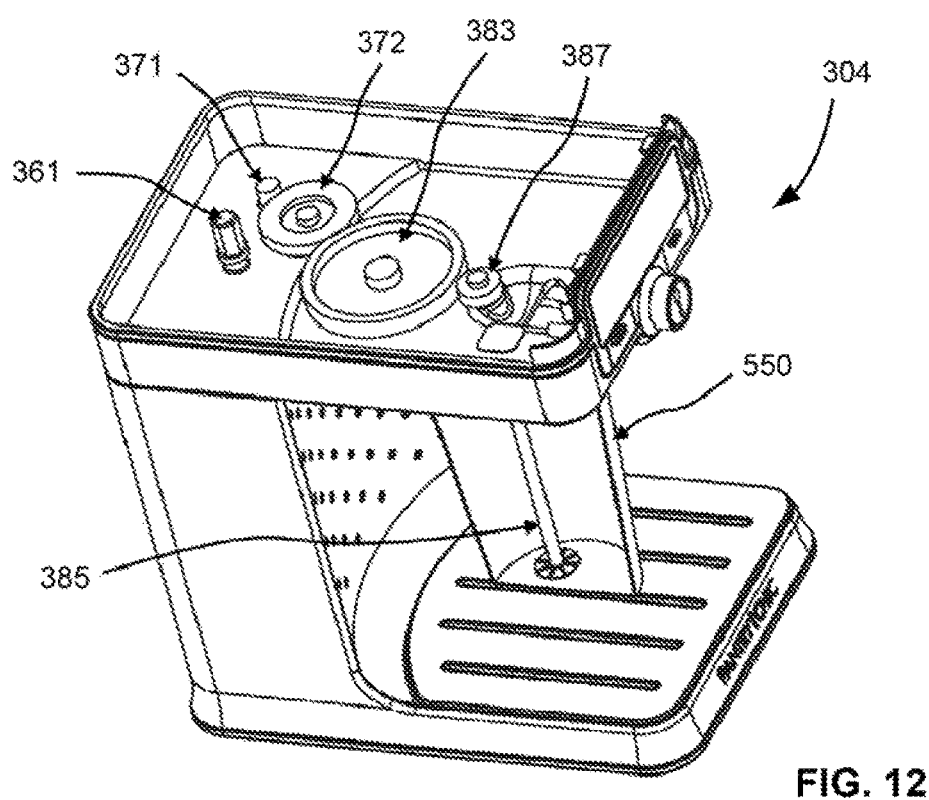
FIG. 12 illustrates another perspective view of the precision measurement dispenser and mixing apparatus in FIG. 11, with a drink cup in partial section, in accordance with various embodiments.

In various embodiments, a base unit 304 may drive a single mixer component, such as one of the mixer blades 380, the mixer whisks 381, or even a drink mixer blade 385 as illustrated in FIGS. 11 and 12. In place of the mixing bowl (e.g., 500), in various embodiments a drink cup 550 may be used. The drink mixer blade 385 may be configured to accommodate common drink cups, for mixing ingredients directly in the drink cup that may be served. In FIG. 12, the drink cup 550 is shown in section to reveal the drink mixer blade 385 extending down from the base unit 304 into the drink cup 550. The single mixer component may be configured to extend into the drink cup (or the mixing bowl 500)

in a more central lateral position relative to the two-blade mixer configuration of FIGS. 8 and 9.

Similar to dual motors included in the base unit 301 (e.g., FIGS. 8 and 9), the base unit 304 may include the drive motor (e.g., 355) as well as the additional motor 345. In FIG. 11, a portion of the lower housing (e.g., 330) has been removed to reveal the additional motor 345 therein. By including the drive motor plus the additional motor 345, the base unit 304 may separately drive the gears controlling the dispensing mode and the mixing mode. In addition, separate motors may enable the mixing coupler 371 to operate at much higher rotational speeds than the drive coupler 361. Alternatively as with other embodiments including two motors, the roles of the drive coupler 361 (as well as the drive motor) and mixing coupler 371 (as well as the additional motor 345) may be reversed so that the drive coupler 361 drives the drink mixer blade 385 and the mixing coupler 371 drives the dispensing mechanism (e.g., 250).

The additional motor 345 may drive the mixing coupler 371 that is separate from the dispense coupler 361. The mixing coupler 371 may drive the internal gear assembly 360, including a modified idler gear train (e.g., intermediate gears 372, 383, 387) that ultimately drives the drink mixer blade 385 or other mixing component. Alternately, a clutch assembly (e.g., 362) may be provided that engages the modified idler gear train when the dispense motor is turning in one direction, but does not engage the modified idler gear train when the dispense motor is turning in the opposite direction.

Figure 13:
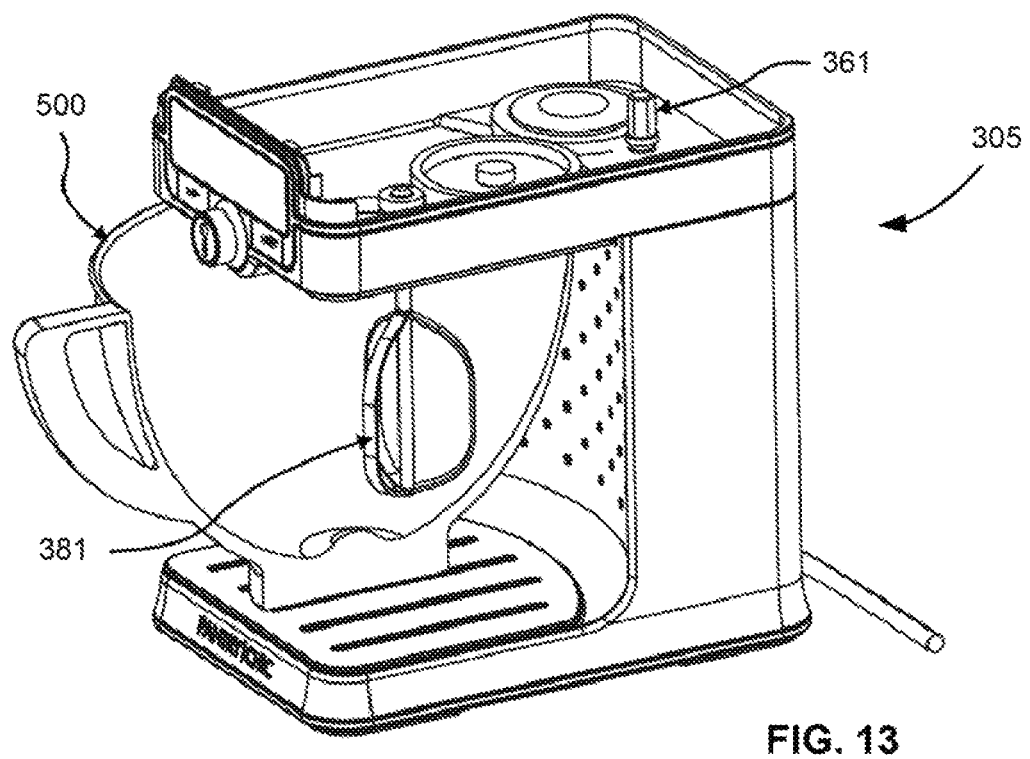
FIG. 13 illustrates a perspective view of a precision measurement dispenser and mixing apparatus with a single mixing component in a mixing bowl, in partial section, in accordance with various embodiments.

In various embodiments, a base unit 305 may drive a single mixer component as well as the dispense mechanism in the ingredient container using a single drive motor (e.g., 335), as illustrated in FIG. 13. The base unit 305 may include the drive coupling 361, which may be driven by the drive motor to operate the dispensing mechanism (e.g., 250) in the dispensing mode and to operate the single mixer component in the mixing mode. In this way, the base unit 305 may combine element of the base unit 300 (e.g., FIG. 7) and the base unit 304 (e.g., FIGS. 11 and 12).

Figure 14:
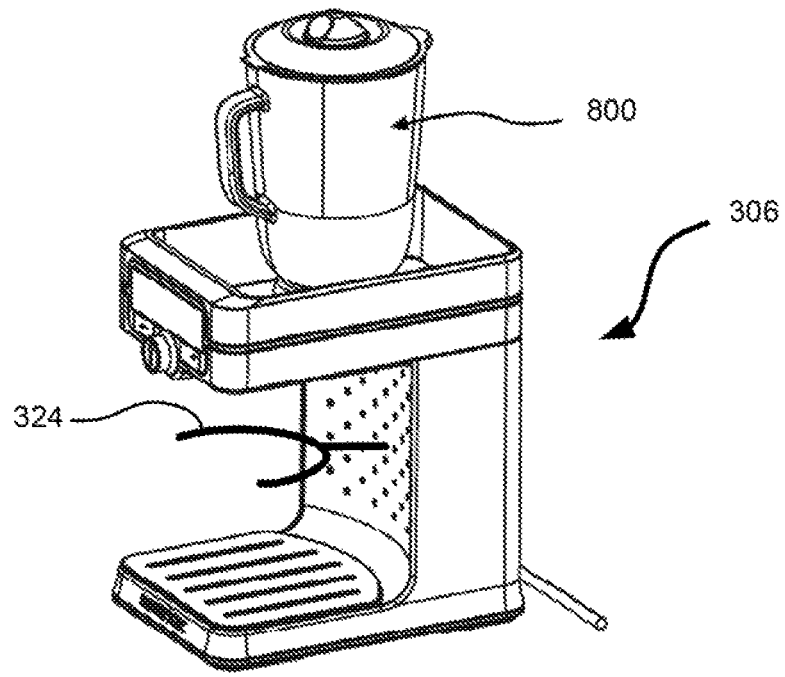
FIG. 14 illustrates a perspective view of a precision measurement dispenser and mixing apparatus with a blender attachment and a hook scale in accordance with various embodiments.

FIG. 14 illustrates various optional elements that may be included in any of the various embodiments. In particular, FIG. 14 shows a top-mounted blender attachment 800, which may be seated on a rotary coupling in the upper recess area 355 of the base unit 306. The blender attachment 800 may be mounted to the top of base unit 306 when the ingredient container 200 has been removed. The rotary coupling included in the base unit 306 may receive and drive the blender attachment 800 like a conventional blender. Otherwise, the base unit 306 may be similar to and/or include any of the individual features of the various other embodiments (i.e., base units 300, 301, 302, 303, 304, 305).

An addition feature included in the base unit 306, which may be included in any of the various other embodiments, is the hook scale 324. The hook scale 324 may function similar to the dispensed ingredients scale (e.g., 325), but may be configured to suspend the mixing bowl or drink cup off the housing platform. The hook scale 324 may include a set of cantilevered arms, a clamp, a platform or other mechanical element configured to hold the mixing bowl or other container in the retention area. Alternatively, the hook scale 324 may hang down from a horizontal surface of the upper housing, rather than extending laterally from a vertical surface of the upper housing.

Figure 15:
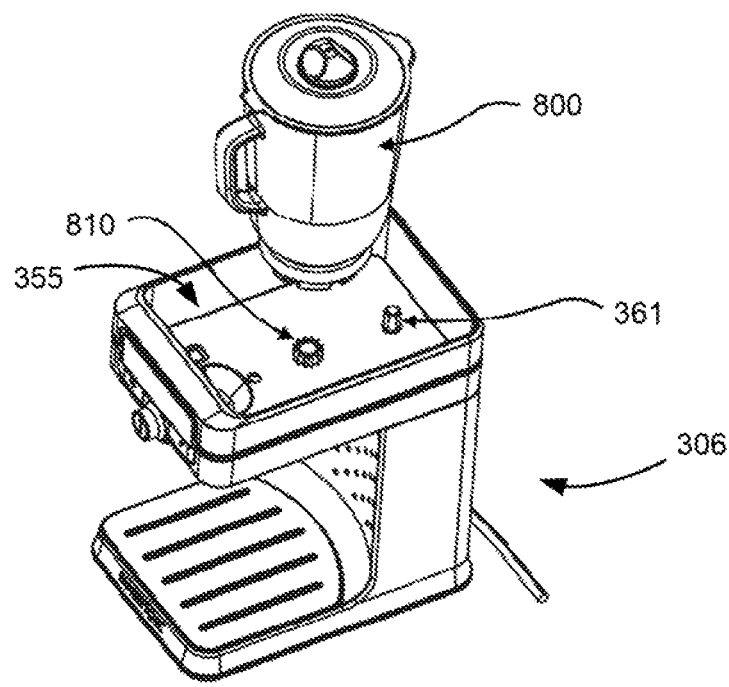
FIG. 15 illustrates a top perspective view of the precision measurement dispenser and mixing apparatus of FIG. 14, with the blender attachment separated, in accordance with various embodiments.
Figure 16:
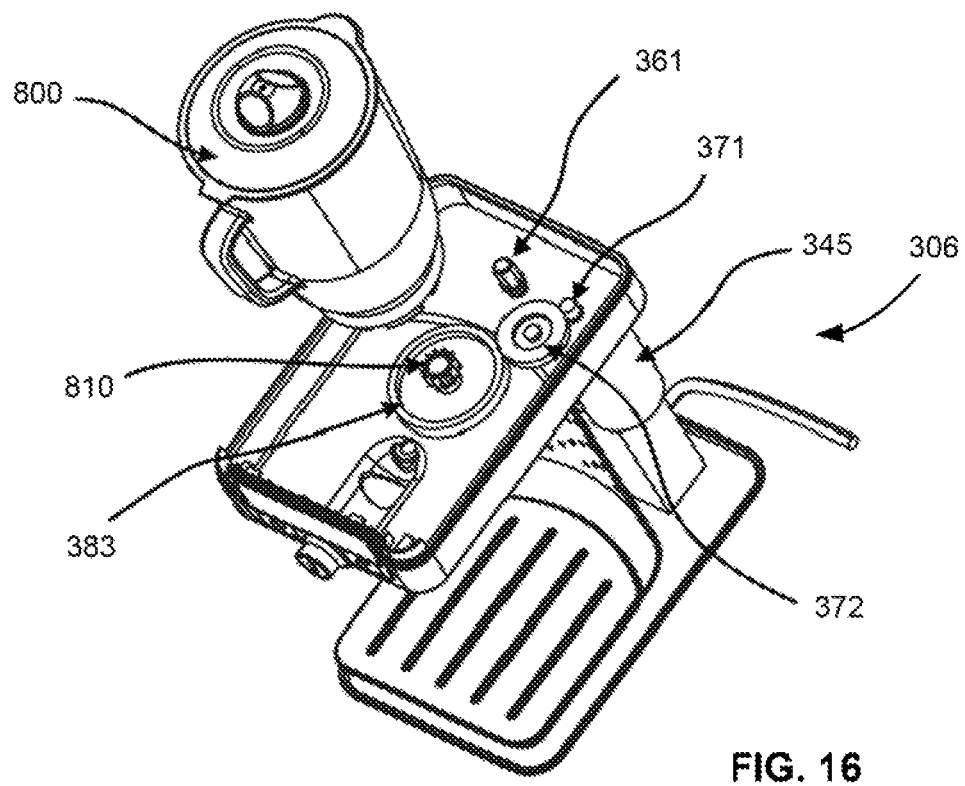
FIG. 16 illustrates a top perspective view of the precision measurement dispenser and mixing apparatus of FIG. 15, with portions of the upper housing removed, in accordance with various embodiments.

FIGS. 15 and 16 show a top perspective view of the base unit 306 illustrated in FIG. 14, in accordance with various embodiments. In various embodiments, a rotary coupling 810 may be included or added to the upper recess area 355. The rotary coupling 810 may be small enough as to not interfere with the ingredient container (e.g., 200) mounted in the upper recess area 355. Alternatively, the rotary coupling 810 may be a removable gear-type element, which may be installed only when using the blender attachment 800. In addition, the rotary coupling 810 may be positioned far enough away from the dispense coupler 361, so the dispense coupler 361 does not interfere with the blender attachment 800 when mounted on the base unit 306.

FIG. 16 shows the base unit 306 illustrated in FIG. 15, but with a floor panel of the upper recess area 355 removed to reveal intermediate gears 372, 383. The intermediate gears 372, 383 that may otherwise be used to drive one or more mixing components (e.g., mixer blades 380, mixer whisks 381, or drink mixer blade 385), may couple the mixing coupling 371 to the rotary coupling 810 configured to drive the blender attachment 800.

In various embodiments, the rotary coupling 810 may be driven by the additional motor 345 or even the primary drive motor (e.g., 335) in a dual-motor embodiment. Alternatively, the rotary coupling 810 may be included in a single-motor embodiment (e.g., base unit 300).

Figure 17:
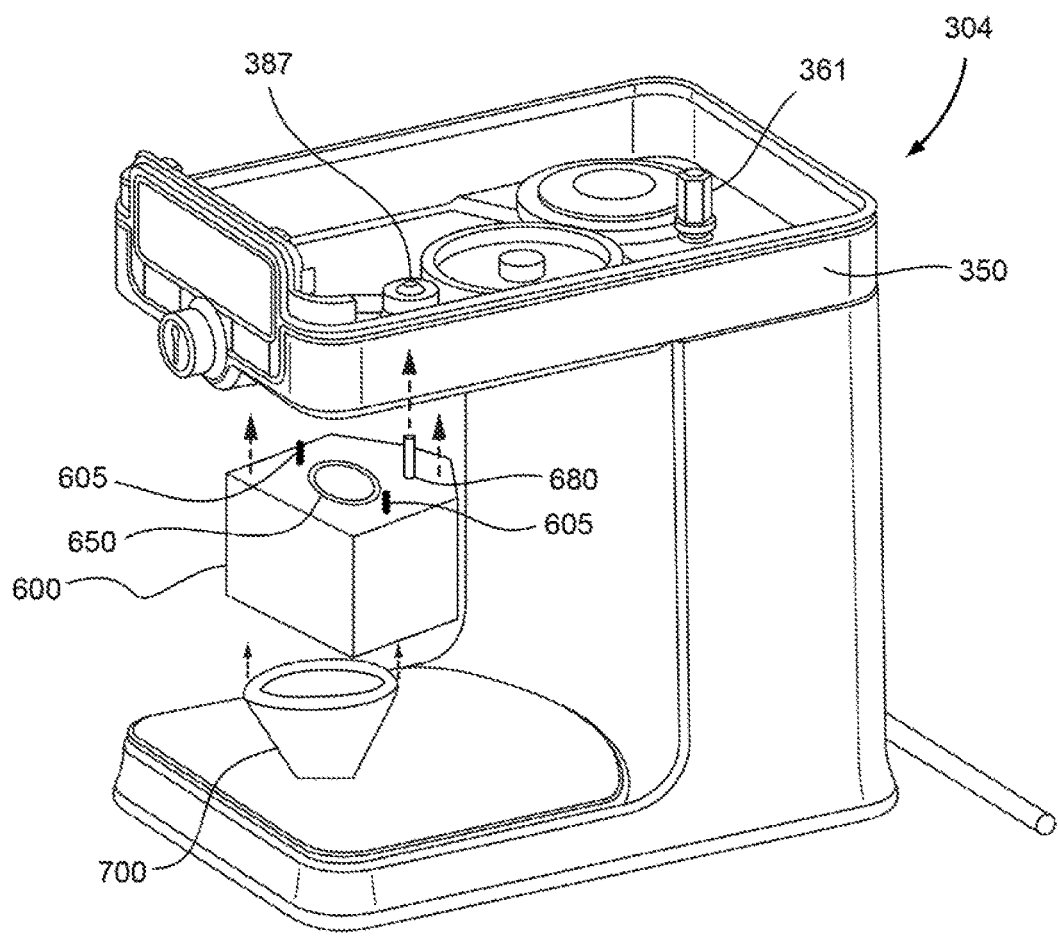
FIG. 17 illustrates a perspective view of the precision measurement dispenser and mixing apparatus with a grinder and filter attachments in accordance with various embodiments.

FIG. 17 illustrates a further optional accessory that may be included with any of the various embodiments described herein. In particular, FIG. 17 shows a perspective view of a grinder attachment 600 aligned to be mounted under the dispensing aperture (e.g., 352) in the upper housing (e.g., 350) of the base unit 304. The grinder attachment 600 may be mounted to the top of base unit 306 when the mixing bowl (or the drink cup) has been removed. In addition, FIG. 17 shows a filter attachment 700 aligned to be mounted under the grinder attachment 600 for catching dispensed ingredients from the grinder attachment 600. In various embodiments, the filter attachment 700 may be attached to a retention device 327 on the lower platform, or sit directly on the lower platform 320.

The grinder attachment 600 may be removably secured to the underside of the upper housing 350 of the base unit 304. The grinder attachment 600 may be used to grind ingredients (e.g., 10), such as coffee beans or other coarse ingredients. Grinder attachment 600 may have a grinder opening 650 that aligns with or mates to dispensing aperture 352 of the upper housing 350. The grinder opening 650 may allow ingredients to pass from the ingredient container 200 into the grinder attachment 600. In various embodiments, the grinder attachment 600 may be driven by the drive motor (e.g., 335) through the drive coupler 361 and intermediate gears that would otherwise drive the mixer components. The grinder attachment 600 may have couplings 605 that act as attachment mechanisms to secure the grinder attachment 600 to the upper housing 350. The grinder attachment 600 may also include a rotary couplings 680 that connects the moving internal components of the grinder attachment 600 (i.e., the mechanism that does the grinding) to an intermediate gears (e.g., 387) otherwise used to drive a mixing component from the underside of the upper housing 350. Alternatively, the grinder attachment 600 may include a separate, self-contained motor or mechanism that allows the grinder attachment 600 to be run by itself without being driven by the drive motor of the base unit 304. As a further alternative or additionally, the grinder attachment 600 may include an internal scale used to measure ingredients dispensed therein.

In various embodiments, other power accessories such as an ice cream maker may be use in place of the grinder attachment 600. Such other power accessories may attach to the upper housing 350 similar to the grinder attachment 600, the mixer blades (e.g., 380), another attachment mechanism, or any combination thereof.

Figure 18:
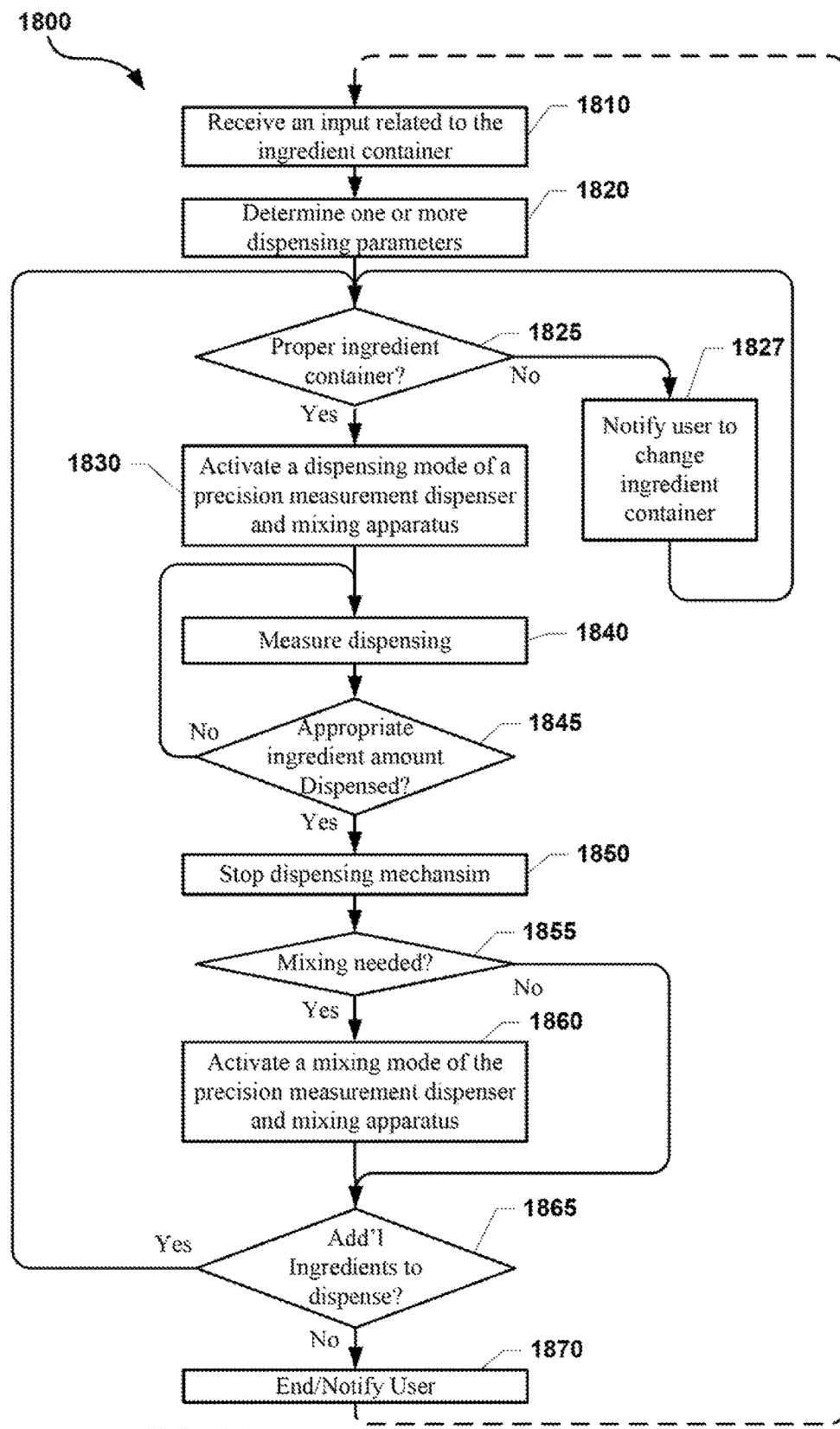
FIG. 18 is a process flow diagram that illustrates a method of dispensing and mixing a precise measurement of ingredients in accordance with an embodiment.

FIG. 18 is a process flow diagram that illustrates a method 1800 of dispensing and mixing a precise measurement of ingredients. The various operations of the method 1800 may be performed by a processor (e.g., in controller 390; FIG. 3), including one or more sensors, receivers, and/or other computing devices and/or one or more remote processors in communication with the precision measurement dispenser and mixing apparatus (e.g., 100), in accordance with various embodiments.

In block 1810, the processor may receive an input related to the ingredient container. The received input may be received from a control panel (e.g., 395; FIGS. 1A-1B), such as manually entered by a user, from a communication port or unit for receiving data from a remote source, and/or from a memory coupled to the processor. The received input may be part of a recipe (i.e., a list of more than one ingredient). The recipe may identify one or more ingredients, a measure for each of the ingredients, and optionally an order for ingredients. The received input may include a measure of one or more ingredients, by weight or volume, that a user wants dispensed from the precision measurement dispenser and mixing apparatus (e.g., 100). The measure of the ingredient to be dispensed may be provided using standard units used to express ingredient measurements. The received input may also include a desired ingredient identifier associated with a type of ingredient and used by the processor to ensure that an appropriate ingredient container is used so that the right ingredient is dispensed. In this way, the desired ingredient identifier may be matched to a container identifier directly associated with an ingredient container holding a particular ingredient. A recipe may also include a desired or required order of ingredients to allow the processor to ensure that the correct ingredients are dispensed in a proper order. Thus, if the processor determines an incorrect ingredient container is mounted on the apparatus, the processor may notify a user (e.g., providing a visual output, such as on a display on the control panel, providing audible feedback, or other output). In various embodiments, only certain ingredients may require a particular order, while other ingredients or types of ingredients may be dispensed in any order.

In block 1820, the processor may determine one or more dispensing parameters. For example, one dispensing parameter may include an amount of time a dispensing mechanism of the ingredient container should be driven in order to properly and precisely dispense the measure of the ingredients indicated by the received input in block 1810. The processor may also determine an amount of time the dispensing mechanisms should be driven based on the type of ingredient indicated by an identifier included in the received input. This may include the processor determining how quickly or slowly to turn the augers to dispense the amount of ingredient over a period of time. Another dispensing parameter may include a measure of weight or volume for the ingredient(s) to be dispensed. Additionally, an amount of rotation or number of rotations of the auger (e.g., 252) in the dispensing mechanism (e.g., 250) may be used as a substitute for weight or volume of ingredients, and thus used as a dispensing parameter. Determining the one or more dispensing parameters may require a conversion of the received input (i.e., in block 1810) to a measure of weight or volume, and/or an amount of time the dispensing mechanism should be driven.

In determination block 1825, the processor may determine whether the proper ingredient container (e.g., 200) is seated on the base unit (e.g., 300) of the precision measurement dispenser and mixing apparatus. This determination may also determine whether an ingredient container currently mounted on the base unit is properly mounted (i.e., not misaligned). In response to determining the proper ingredient container is seated on the base unit (i.e., determination block 1825="Yes"), the processor may activate the dispensing mode in block 1830. In response to determining the proper ingredient container is not seated on the base unit or the current ingredient container is not properly seated on the base unit (i.e., determination block 1825="No"), the processor may notify a user to change or reposition the ingredient container, in block 1827.

In block 1830, the processor may activate a dispensing mode of the precision measurement dispenser and mixing apparatus. Activation of the dispensing mode may cause at least one drive motor in the base unit to drive a dispensing mechanism in the ingredient container. The base unit may be configured to receive the ingredient container in a removably secured position thereon and driving the dispensing mechanism may dispense a quantity of the ingredients from a lower aperture of the ingredient container. The base unit may include a dispensing aperture extending through the base unit and configured to allow the quantity of ingredients dispensed from the ingredient container to pass through the base unit to a removable mixing bowl.

Additionally, a recipe may include time delays between the dispensing of parts of an ingredient and/or between different ingredients. Thus, prior to activation of the dispensing mode in block 1830, the processor may wait a set time period. Such time delays between the dispensing may be used for mixing recently dispensed ingredients or adding other ingredients not being dispensed by the dispensing mechanism (e.g., eggs, spices, extracts, flavorings, etc.). This may also be entered by a user. The dispensing time limit can also be used to determine how long to run a mixer or perform other actions such as rotating the container to help more evenly distribute the ingredient. After determining the dispensing time limit, in block 1830, the processor may active a dispensing mode of a precision measurement dispenser and mixing apparatus. The activation may also be executed manually by a user selecting a "start" or other option to active the dispenser.

In block 1840, the processor and/or a timer may measure the dispensing from the dispensing mode. For example, the processor and/or a timer may measure an amount of time (i.e., how long) the dispensing mechanism has been driven by the at least one drive motor in the dispensing mode. Alternatively or additionally, the processor may measure a weight or volume of the ingredients that have been dispensed in the dispensing mode. The measure of the dispensing may measure only the current dispensing mode or keep a tally of one or more different instances of dispensing in the dispensing mode.

In determination block 1845, the processor may determine whether an appropriate ingredient amount has been dispensed in the current dispensing mode based on the measure of the dispensing in block 1840. If the appropriate ingredient amount has not been dispensed (i.e., determination block 1845—"No"), the processor may continue the measurement of the dispensing in block 1840. If the appropriate ingredient amount has been dispensed (i.e., determination block 1845="Yes"), the processor may stop the dispensing mechanism in block 1850.

In block 1850, the apparatus may stop the dispensing mechanism. Stopping the dispensing mechanism may stop, for now, further dispensing of ingredients from the ingredient container.

In determination block 1855, the processor may determine whether mixing of ingredient is needed. The determination as to whether mixing is needed may be based on the received input from block 1810. Alternatively, whether mixing is needed may be based on an additional input or another source. In response to determining that mixing is not needed (i.e., determination block 1855—"No"), the processor may determine whether additional ingredients need to be dispensed in determination block 1865. In response to determining that mixing is needed (i.e., determination block 1855="Yes"), the processor may activate a mixing mode in block 1860.

In block 1860, the processor may activate the mixing mode. Activating the mixing mode of the precision measurement dispenser and mixing apparatus may cause the at least one drive motor to drive a mixing mechanism in the base unit that rotates a mixing component removably coupled to the base unit and configured to extend into the removable mixing bowl. Driving the mixing mechanism may mix the quantity of the ingredients dispensed from the ingredient container into the removable mixing bowl.

In determination block 1865, the processor may determine whether additional ingredients need to be dispensed. In response to determining that additional ingredients do not need to be dispensed (i.e., determination block 1865—"No"), the process may end or the processor may notify a user in block 1870. Notifying the user may include providing a visual output, such as on a display of the control panel, providing audible feedback, or other output. In response to determining that additional ingredients do need to be dispensed (i.e., determination block 1865="Yes"), the processor may return to determination block 1825 to determine whether the proper ingredient container is seated on the base unit. In this way, either more of the same ingredients may be dispensed or different ingredients may be dispensed after the ingredient container is changed (see, block 1827).

Any of the above-mentioned logical block that references time, may in various embodiments operate instead with weight limitations or volume limitations. In various embodiments any combination of time, weight, and volume may be used to precisely dispense ingredients or to operate the precision measurement dispenser and mixing apparatus.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

The functions in the various embodiments may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A precision measurement dispenser and mixing apparatus, comprising:

an ingredient container for holding ingredients, the ingredient container including a dispensing mechanism selectively driven to dispense a quantity of the ingredients from a lower aperture of the ingredient container, wherein the dispensing mechanism includes an auger contained within the ingredient container, wherein the auger is disposed above the lower aperture;

a base unit configured to receive the ingredient container in a removably secured position thereon, wherein removal of the ingredient container from the base unit also removes the auger from the base unit, wherein the base unit includes at least one drive motor, a mixing mechanism, and a dispensing aperture extending through the base unit and configured to allow the quantity of ingredients dispensed from the lower aperture of the ingredient container to pass through the base unit to a removable mixing bowl, wherein the base unit is configured to selectively operate in at least two modes including:
  a dispensing mode in which the at least one drive motor drives the dispensing mechanism of the ingredient container; and
  a mixing mode in which the at least one drive motor drives the mixing mechanism to rotate a mixing component removably coupled to the base unit and configured to extend into the removable mixing bowl for mixing the quantity of the ingredients dispensed from the ingredient container into the removable mixing bowl.

2. The apparatus of claim 1, wherein the base unit includes a container seat and a drive coupling protruding from a base of the container seat, wherein the drive coupling is rotationally driven by the at least one drive motor and configured to mate with the dispensing mechanism when the ingredient container is seated in the container seat.

3. The apparatus of claim 2, wherein the base unit includes a clutch movable into at least one of a first position corresponding to the dispensing mode and a second position corresponding to the mixing mode, wherein in the dispensing mode the clutch couples the at least one drive motor to the dispensing mechanism, wherein in the mixing mode the clutch couples the at least one drive motor to the mixing mechanism.

4. The apparatus of claim 1, wherein the at least one drive motor includes a first motor and a second motor separate from the first motor, wherein activation of the first motor corresponds to the dispensing mode for driving the dispensing mechanism, wherein activation of the second motor corresponds to the mixing mode for driving the mixing mechanism.

5. The apparatus of claim 1, wherein the mixing component includes a pair of mixer blades disposed on opposite sides of the dispensing aperture.

6. The apparatus of claim 1, wherein the base unit includes a lower housing and an upper housing extending laterally away from an upper portion of the lower housing, wherein the dispensing aperture is disposed in the upper housing above the mixing mechanism.

7. The apparatus of claim 6, wherein the at least one drive motor is disposed in the lower housing.

8. The apparatus of claim 1, wherein the base unit includes a container scale for measuring a weight of the ingredient container, wherein the container scale is disposed between the ingredient container and the mixing mechanism.

9. The apparatus of claim 1, wherein the base unit includes a dispensed ingredient scale for measuring a weight of the quantity of the ingredients dispensed from the ingredient container into the removable mixing bowl, wherein the dispensed ingredient scale is disposed below the mixing mechanism.

10. The apparatus of claim 1, further comprising:
  a blender attachment configured to be mounted on the base unit in place of the ingredient container, wherein the blender attachment includes a blender container with an internal cutting unit driven by activation of the at least one drive motor in the mixing mode.

11. The apparatus of claim 1, further comprising a grinder, wherein the grinder is removably secured to a lower surface of an upper housing, wherein the grinder includes a grinder aperture configured to be disposed below the dispensing aperture for receiving the quantity of the ingredients dispensed from the ingredient container.

12. The apparatus of claim 11, wherein the grinder is driven by activation of the at least one drive motor in the mixing mode.

13. The apparatus of claim 1, wherein the dispensing mechanism further comprises at least one agitator configured to move ingredients in the ingredient container towards the auger such that the auger can dispense the ingredients through the lower aperture of the ingredient container.

14. The apparatus of claim 13, wherein the at least one agitator comprises two paddles, wherein each paddle is situated to either side of the auger and configured to feed ingredients in the ingredient container towards the auger such that the auger can dispense the ingredients through the lower aperture of the ingredient container.

15. A method of dispensing and mixing a precise measurement of ingredients, comprising:
  activating a dispensing mode of a precision measurement dispenser and mixing apparatus, wherein activation of the dispensing mode causes at least one drive motor in a base unit to drive a dispensing mechanism in an ingredient container, wherein the dispensing mechanism includes an auger contained within the ingredient container, wherein the auger is configured to dispense the ingredients through a lower aperture of the ingredient container, wherein the base unit is configured to receive the ingredient container in a removably secured position thereon, wherein removal of the ingredient container from the base unit also removes the auger from the base unit, wherein driving the dispensing mechanism dispenses a quantity of the ingredients from the lower aperture of the ingredient container, wherein the base unit includes a dispensing aperture extending through the base unit and configured to allow the quantity of ingredients dispensed from the lower aperture of the ingredient container to pass through the base unit to a removable mixing bowl; and
  activating a mixing mode of the precision measurement dispenser and mixing apparatus, wherein activation of the mixing mode causes the at least one drive motor to drive a mixing mechanism in the base unit that rotates a mixing component removably coupled to the base unit and configured to extend into the removable mixing bowl, wherein driving the mixing mechanism mixes the quantity of the ingredients dispensed from the ingredient container into the removable mixing bowl.

16. The method of claim 15, wherein the at least one drive motor includes a first drive motor used to drive the dispensing mechanism and a second drive motor used separately to drive the mixing mechanism.

17. The method of claim 15, further comprising:
  measuring an amount of time the dispensing mechanism is driven by the at least one drive motor; and
  stopping the dispensing mechanism from further dispensing ingredients from the ingredient container in response to the measured amount of time reaching a time limit.

18. The method of claim 15, further comprising:
  receiving, by a processor of the precision measurement dispenser and mixing apparatus, an identifier associated with a ingredients in the ingredient container; and determining, by the processor, an amount of time the dispensing mechanism should be driven for dispensing the ingredients indicated by the identifier.

* * * * *